United States Patent
An et al.

(10) Patent No.: US 9,533,658 B2
(45) Date of Patent: Jan. 3, 2017

(54) WIPER CONNECTOR FOR VEHICLE

(71) Applicant: KBWS CORPORATION, Daegu (KR)

(72) Inventors: Jae Hyuck An, Daegu (KR); Woo Sung Lee, Daegu (KR)

(73) Assignee: KBWS Corporation, Daegu (KR)

( * ) Notice: Subject to any disclaimer, the term of this patent is extended or adjusted under 35 U.S.C. 154(b) by 14 days.

(21) Appl. No.: 14/273,364

(22) Filed: May 8, 2014

(65) Prior Publication Data
US 2014/0338144 A1    Nov. 20, 2014

(30) Foreign Application Priority Data
May 15, 2013   (KR) .......... 10-2013-0054741

(51) Int. Cl.
*B60S 1/38*   (2006.01)
*B60S 1/40*   (2006.01)

(52) U.S. Cl.
CPC ............ *B60S 1/4038* (2013.01); *B60S 1/3801* (2013.01); *B60S 1/4003* (2013.01); *B60S 2001/3843* (2013.01); *B60S 2001/4051* (2013.01); *B60S 2001/4058* (2013.01); *B60S 2001/4061* (2013.01)

(58) Field of Classification Search
CPC ............ B60S 1/4038; B60S 2001/4051; B60S 2001/4058; B60S 2001/4061; B60S 1/4041; B60S 1/4045; B60S 1/4048; B60S 2001/4054; B60S 1/4064; B60S 1/4003
USPC ..................................................... 15/250.32
See application file for complete search history.

(56) References Cited

U.S. PATENT DOCUMENTS

| | | | |
|---|---|---|---|
| 6,654,983 B1* | 12/2003 | Raynaud ............... | B60S 1/4038 15/250.32 |
| 2006/0218740 A1* | 10/2006 | Coughlin .............. | B60S 1/4038 15/250.32 |
| 2007/0220698 A1* | 9/2007 | Huang .................. | B60S 1/3856 15/250.32 |
| 2008/0222830 A1* | 9/2008 | Chiang ................. | B60S 1/3848 15/250.32 |

(Continued)

FOREIGN PATENT DOCUMENTS

| | | |
|---|---|---|
| JP | 2008-285140 A | 11/2008 |
| JP | 2013-056663 A | 3/2013 |
| KR | 10-2012-0062020 | 6/2012 |

OTHER PUBLICATIONS

German Office Action, German Application No. 10 2014 106 261.2, Nov. 7, 2014, 5 pages (with concise explanation of relevance).

*Primary Examiner* — Monica Carter
*Assistant Examiner* — Andrew A Horton
(74) *Attorney, Agent, or Firm* — Fenwick & West LLP

(57) ABSTRACT

A wiper connector for a vehicle may be provided which connects a wiper arm to a wiper blade 10 and includes: a body 320 including a pair of elastic moving pieces 362 which is formed on one end thereof and faces each other, and one or more coupling parts 330 and 340 which are formed on both sides thereof and by which the wiper arm is caught; and a cover 310 movable to a fixing position for fixing the wiper arm which is caught by the body 320 and to a release position for releasing the fixed wiper arm. The pair of the elastic moving pieces 362 elastically restrains the movement of the cover 310 at the fixing position and allows the cover 310 to move to the release position when a releasing force for removing the elastic restraint is applied to the elastic moving piece 362.

13 Claims, 31 Drawing Sheets

(56) References Cited

U.S. PATENT DOCUMENTS

| | | | |
|---|---|---|---|
| 2008/0289133 A1* | 11/2008 | Kim | B60S 1/387 |
| | | | 15/250.32 |
| 2010/0050360 A1* | 3/2010 | Chiang | B60S 1/386 |
| | | | 15/250.32 |
| 2010/0205763 A1 | 8/2010 | Ku | |
| 2011/0277265 A1 | 11/2011 | Ehde | |
| 2012/0054976 A1* | 3/2012 | Yang | B60S 1/3867 |
| | | | 15/250.32 |
| 2012/0279008 A1* | 11/2012 | Depondt | B60S 1/387 |
| | | | 15/250.32 |
| 2012/0317740 A1* | 12/2012 | Yang | B60S 1/3801 |
| | | | 15/250.32 |

* cited by examiner

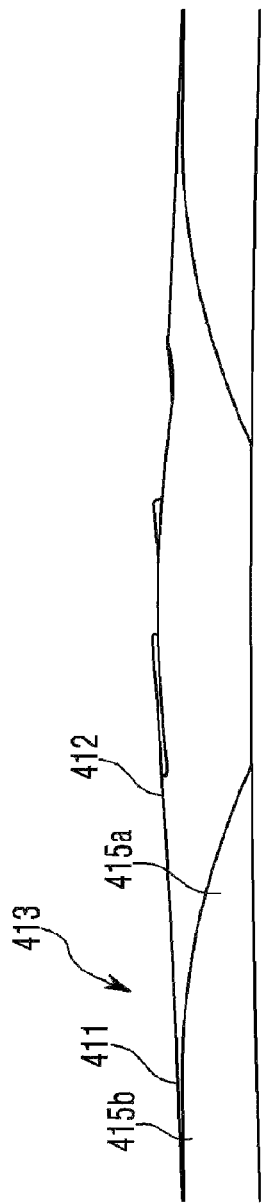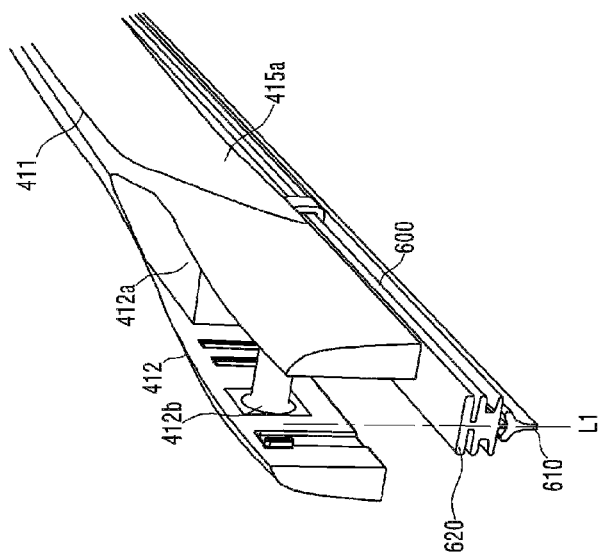

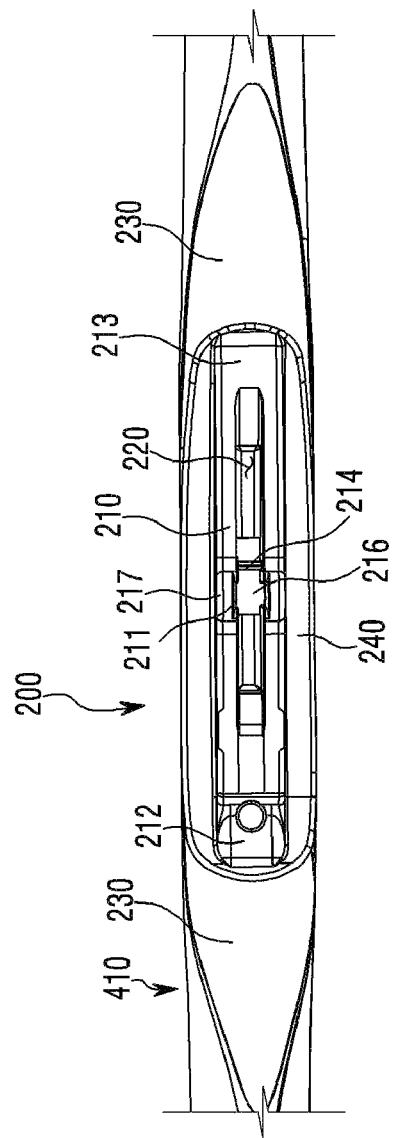

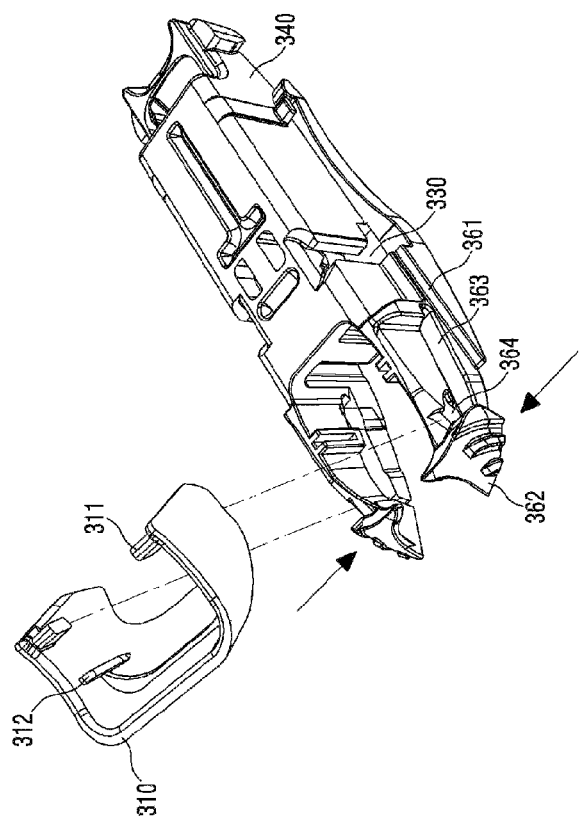
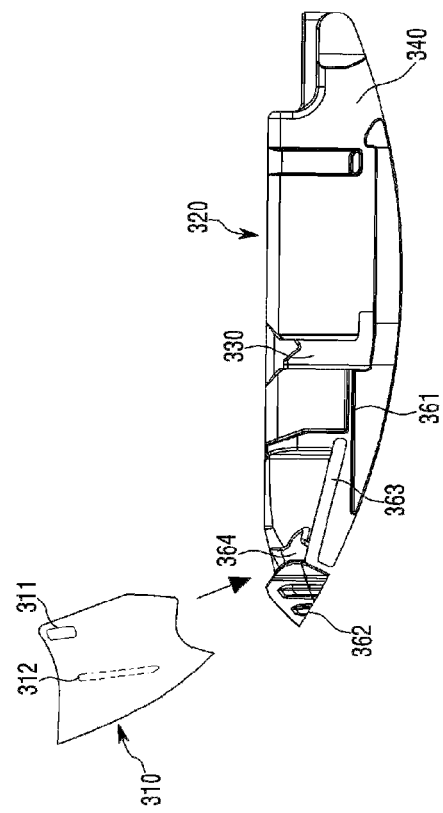
Fig. 13a
Fig. 13b

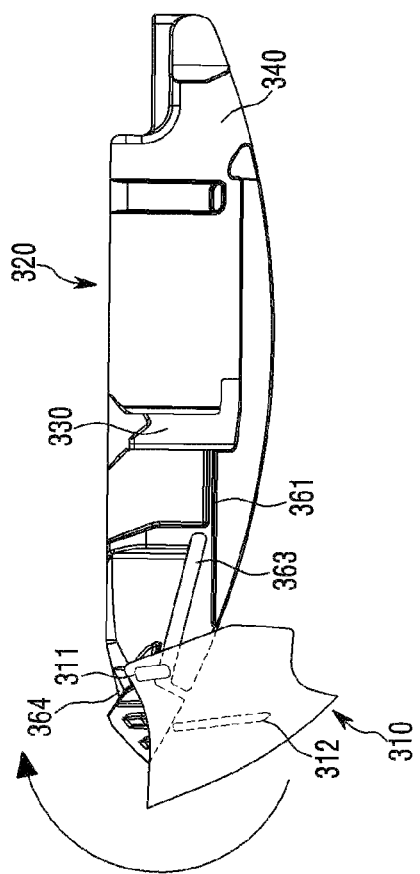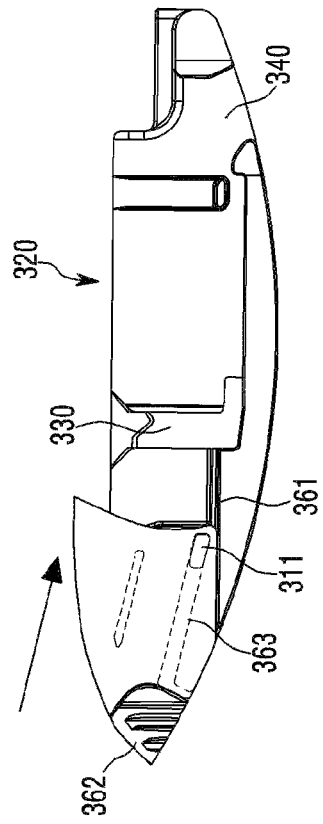
Fig. 13c
Fig. 13d

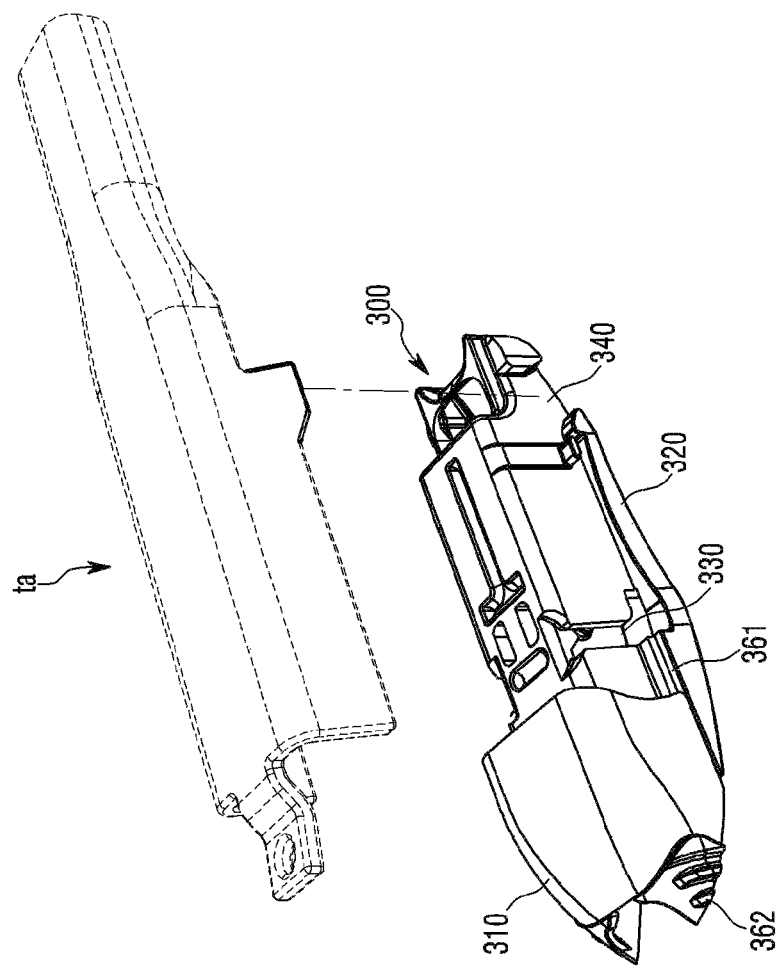

WIPER CONNECTOR FOR VEHICLE

CROSS-REFERENCE TO RELATED APPLICATIONS

The present application claims priority under 35 U.S.C. §119(a) to Korean Patent Application No. 10-2013-0054741, filed on May 15, 2013, which is incorporated by reference herein in its entirety.

BACKGROUND

Field

The present invention relates to a wiper connector for a vehicle, which connects a wiper blade with a wiper arm.

Description of Related Art

In general, a wiper blade removes impurities, snow, rain or the like when driving and prevents a driver's front sight from being deteriorated and performs a repetitive reciprocating action in a fan shape as a motor drives a link apparatus connected to a wiper arm.

A conventional wiper blade includes a lever assembly configured by connecting levers of metal materials in a tournament type. In the lever assembly, a plurality of tournament levers curve a wiper strip, so that the wiper strip having a backing plate installed therein traces a curvature of a vehicle glass.

The wiper blade has a problem in that the wiper blade lifts by an air pressure applied to a glass surface when the vehicle is driven at a high speed and chattering occurs.

Further, in order to accept various types of wiper driving arms having different standards and shapes for each kind of vehicle, conventional wiper blades have been released in a dedicated product types corresponding to the wiper driving arms.

That is, the conventional driving arm for the vehicle is largely classified into a "U" shaped clip type having a catching structure, a bayonet type fitted as a plug type, a pin type forming a protrusion in a side portion and taking a fitting structure by the protrusion, a side hole type performing a fitting coupling in a side portion of a wiper apparatus, developed by a Bosch corporation, and a top-lock type performing a coupling by a covering structure in an upper portion of the wiper apparatus, and the various types of driving arms have a limitation in that they can use only dedicated wiper apparatuses since their shapes and sizes are different from other.

SUMMARY

One embodiment is a wiper connector for a vehicle may be provided which connects a wiper arm to a wiper blade 10 and includes: a body 320 including a pair of elastic moving pieces 362 which is formed on one end thereof and faces each other, and one or more coupling parts 330 and 340 which are formed on both sides thereof and by which the wiper arm is caught; and a cover 310 movable to a fixing position for fixing the wiper arm which is caught by the body 320 and to a release position for releasing the fixed wiper arm. The pair of the elastic moving pieces 362 elastically restrains the movement of the cover 310 at the fixing position and allows the cover 310 to move to the release position when a releasing force for removing the elastic restraint is applied to the elastic moving piece 362.

The cover 310 may surround both sides of a portion of the body 320 and may have an open front side thereof such that one end of the cover 310 is caught at the fixing position by the elastic moving piece 362 and the elastic moving piece 362 is located within the lower portion of the cover 310 at the release position.

The elastic moving piece 362 may be formed at the fixing position to contact with at least a portion of an end of the cover 310.

The body 320 may further include a coupling recess 363 formed in both sides thereof. A pair of coupling protrusions 311 formed within the cover 310 may be coupled to the coupling recess 363 and may guide a forward and backward movement of the cover 310.

The coupling recess 363 may be formed to be inclined upwardly toward a front of the connector 300.

The body 320 may further include a coupling guide part 364 which is formed on both sides of the body 320 and guides the coupling of the pair of the coupling protrusions 311 of the cover 310 and the coupling recess 363. The coupling of the coupling protrusion 311 and the coupling recess 363 may be performed by the following process that the pair of the elastic moving pieces 362 is closer to each other, the cover 310 is rotated at a predetermined angle such that the coupling protrusion 311 is inserted into the coupling guide part 364 in accordance with the shapes of the coupling protrusion 311 and the coupling guide part 364, the coupling protrusion 311 is guided from the top to the bottom of the body 320 along the coupling guide part 364, and the cover 310 is rotated in an opposite direction to the rotation direction of the predetermined angle.

The body 320 may further include a fitting part 350 which is formed to protrude within the body 320 and is fitted and coupled to a fitting recess 211 formed approximately in the center of the wiper blade 10.

The fitting part 350 slides on the fitting recess 211 from the top to the bottom of the fitting recess 211 and an upward movement of the fitting part 350 is restricted by a catching protrusion 215 formed on the fitting recess 211, so that the fitting part 350 may be coupled to the fitting recess 211.

A protrusion receiving recess 220 into which a lower protrusion 351 formed in a lower portion of the body 320 is inserted may be formed in a central portion 210 of the wiper blade 10. The central portion 210 may be comprised of a pair of plate-shaped members which faces each other and protrudes parallel to each other. A bottom surface of the body 320 may include a central portion receiving recess 355 receiving the pair of the plate-shaped members. An uneven structure may be formed on at least a portion of a side of the lower protrusion 351 and a side 352 of the central portion receiving recess 355.

A central connection portion 214 connecting the plate-shaped members may be formed between the pair of the plate-shaped members. The lower portion of the body 320 may include a central connection recess 354 receiving the central connection portion 214.

The central portion 210 may include an opening 216 extending through the central portion 210.

The wiper connector may be selectively connected either to a wiper arm (ta) including a tap which contacts with the top surface and both sides of the wiper connector and extends toward the cover 310, or to a wiper arm (ca) including a cap which contacts with the top surface or side of the wiper connector.

BRIEF DESCRIPTION OF THE DRAWINGS

The embodiment will be described in detail with reference to the following drawings.

FIG. 8b is a front view of the connection holder of the wiper blade according to the present invention;

FIG. 8c is an exploded perspective view of the connection holder of the wiper blade according to the present invention;

FIG. 10b is a transverse sectional perspective view of the adaptor part of the wiper blade shown in FIG. 10a;

FIG. 10c is a plan view of the adaptor of the wiper blade according to the present invention as viewed from the top;

FIGS. 13a to 13d are a perspective view and side views showing how the cover 310 and body 320 of the connector 300 are coupled to each other;

FIG. 15b is a cross sectional view taken along line A-A of FIG. 15a, and FIG. 15c is a cross sectional view taken along line B-B of FIG. 15a;

FIGS. 16a and 16b are views showing how a wiper arm and the connector are coupled to each other;

DETAILED DESCRIPTION

Hereinafter, the present invention will be described with reference to the accompanying drawings. A detailed description of the components of the present invention which can be clearly grasped and easily implemented by those skilled in the art through the prior arts will omitted not to make the subject matter of the present invention unclear.

Figure 1A:
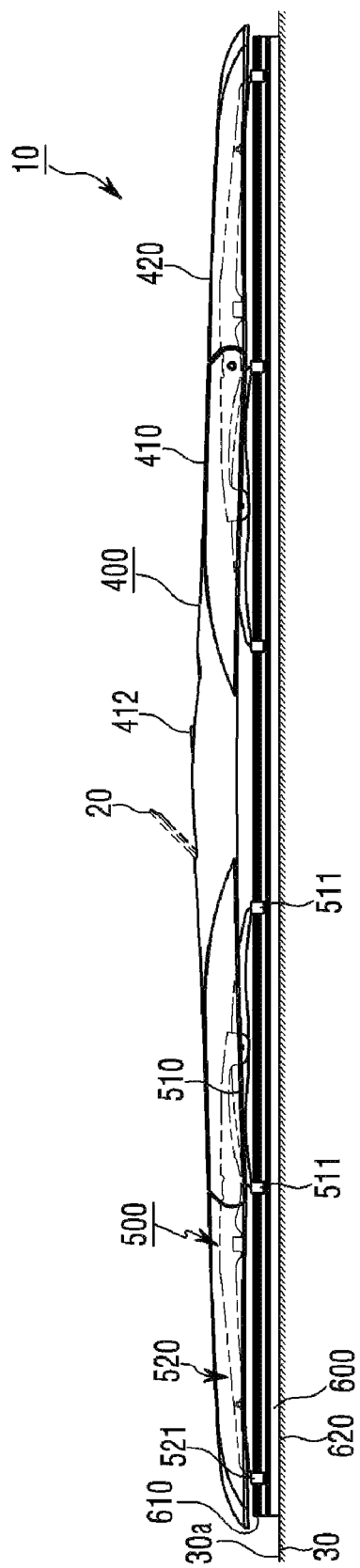
FIGS. 1a and 1b are a front view and a perspective view of a whole configuration of a wiper blade according to the present invention.
Figure 1B:
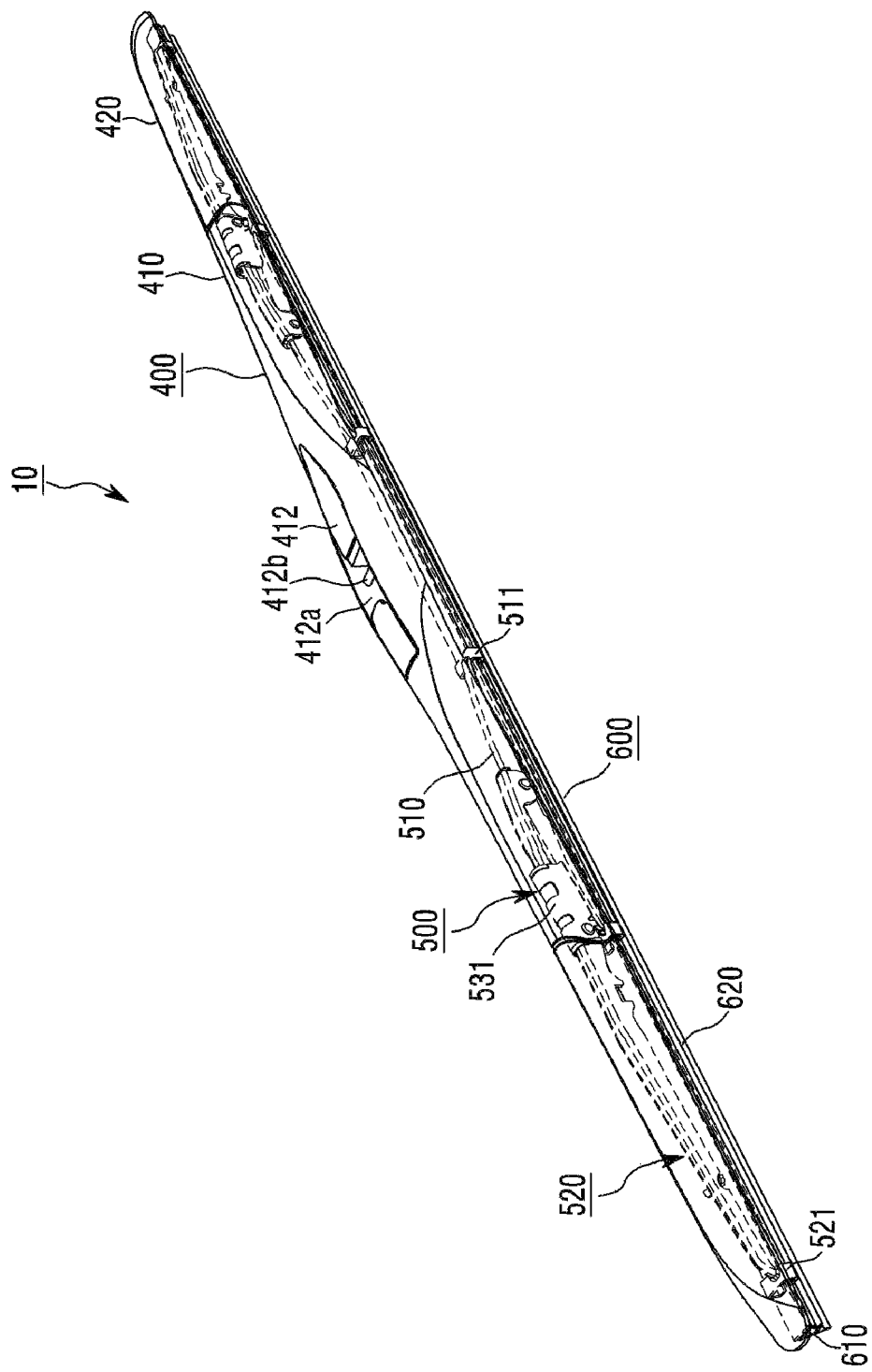

An Overall Configuration of a Wiper Blade Assembly According to the Present Invention FIGS. 1a and 1b are front view and a perspective view showing an embodiment including some characteristics of a wiper blade according to the present invention.

Referring to FIGS. 1a and 1b, a wiper blade 10 according to the present invention includes an adaptor part 200 (not shown in FIGS. 1a and 1b) connected with a connector 300 (not shown) provided at an upper end of the wiper blade 10 and configured to fixedly support an end portion of a wiper arm, a wiper strip 600 coming into contact with a window glass surface of a vehicle to wipe the window glass surface of the vehicle, a plurality of lever assemblies 500 connected to each other in a tournament type and configured to support the wiper strip 600, and a cover part 400 for receiving the lever assemblies 500.

Figure 2A:
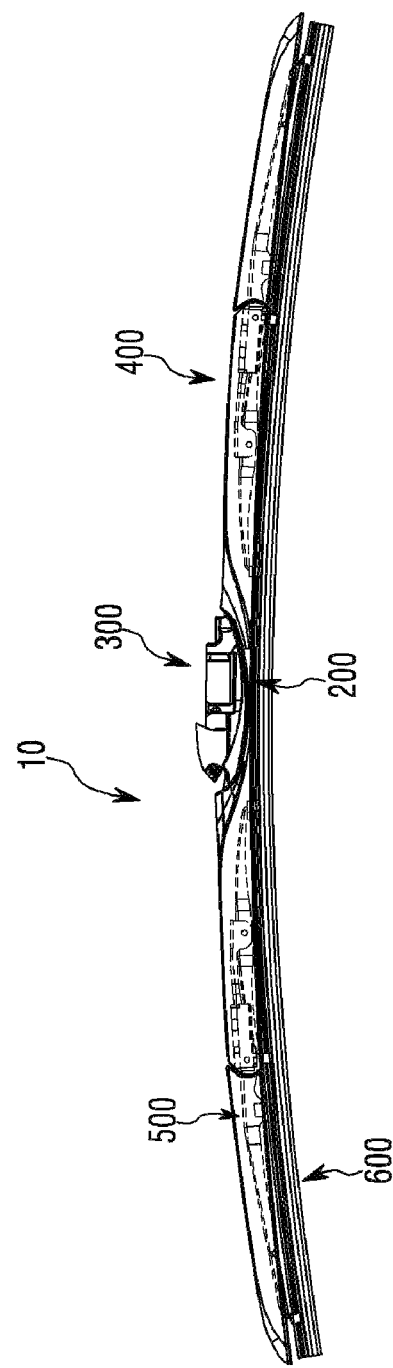
FIGS. 2a and 2b are a front view and a perspective view of a whole configuration of the wiper blade in which an adaptor is formed and to which a connector is coupled in accordance with the present invention.
Figure 2B:
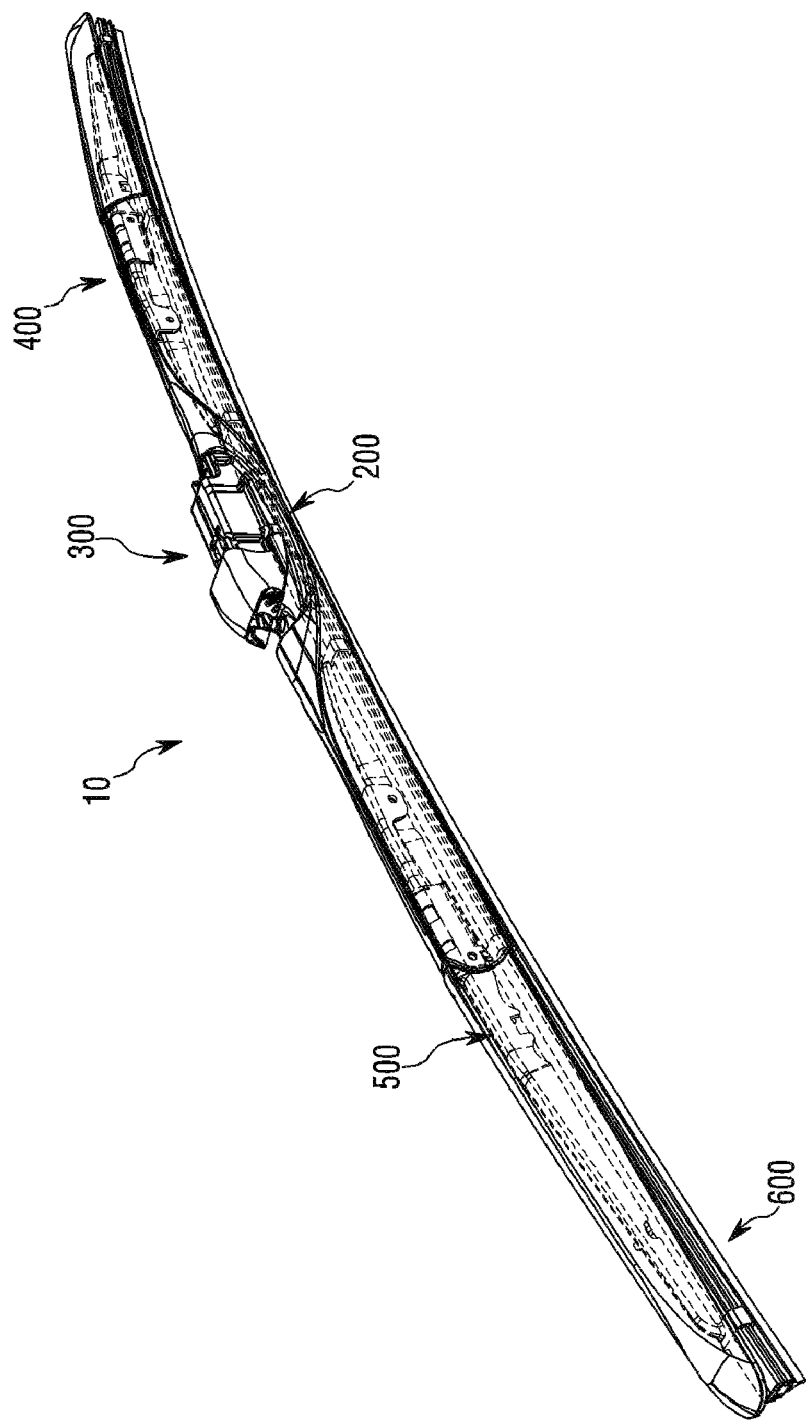

FIGS. 2a and 2b are a front view and a perspective view of the wiper blade according to another embodiment of the present invention.

Referring to FIGS. 2a and 2b, the adaptor part 200 is provided at the vicinity of a center of the cover part 400 of the wiper blade of FIGS. 1a and 1b. The connector 300 is mounted to the adaptor part 200, which will be described below in detail, and the connector 300 receives a front end of the wiper arm.

Hereinafter, the wiper blade shown in FIGS. 1a and 1b will be described in detail.

The wiper blade 10 is connected to the front end of the wiper arm (not shown), and receives a pressurizing force from the wiper arm with respect to a glass surface 30a (a wiping surface) of vehicle glass 30. The wiper arm is reciprocately rotated at a predetermined angle by a wiper motor (not shown), and the wiper blade 10 wipes on the glass surface 30a within a range of the predetermined angle.

Figure 3A:
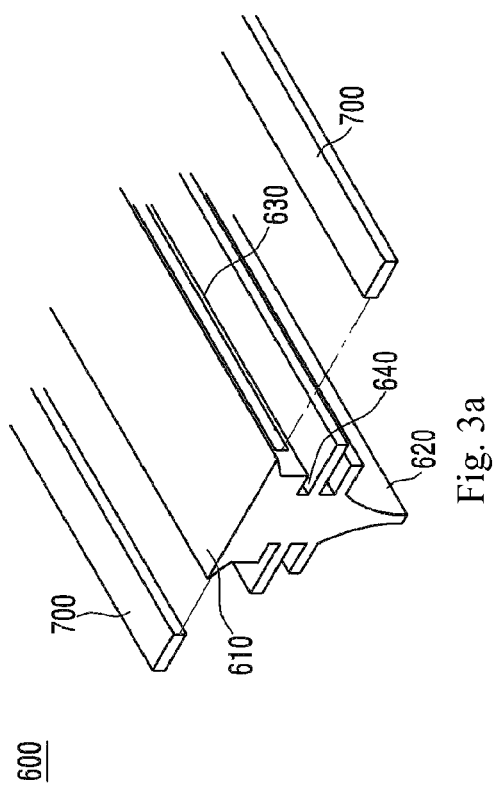
FIG. 3a is a perspective view of one end of a wiper strip according to the present invention.
Figure 3B:
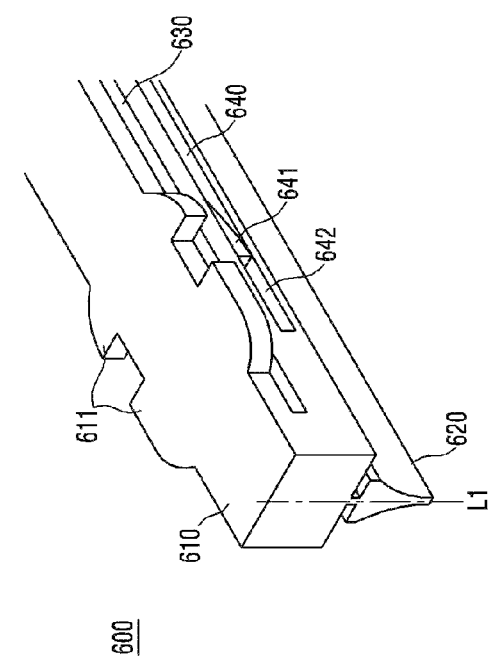
FIG. 3b is a perspective view of the other end of the wiper strip according to the present invention.

FIGS. 3a and 3b are partial perspective views showing respectively one end and the other end of the wiper strip 600.

As shown in FIGS. 1a, 1b, 3a, and 3b, the wiper blade 10 further includes two backing plates 700 mounted to the wiper strip 600. The lever assembly 500 includes a plurality of first levers 510 and a plurality of second levers 520. For convenience of description of the present invention, the wiper blade 10 comprised of a pair of the first levers 510 and a pair of the second levers 520 will be described.

Referring to FIGS. 1a, 1b, 3a and 3b, the wiper strip 600 includes a wiping lip part 620 directly coming into contact with the glass surface 30a to perform the wiping action, and a base part 610 supported by the lever assembly 500. The wiper strip 600 is disposed to slidably come into contact with the glass of the vehicle and removes a foreign material from a surface of the glass. The wiper strip 600 extends in a longitudinal direction and is made of an elastic material such as a rubber material or an elastic synthetic material.

The base part 610 is supported by fasteners 511 and 521 of a first lever 510 and a second lever 520 of the lever assembly 500. The fasteners 511 and 521 may have a yoke shape. The base part 610 and the wiping lip part 620 continuously extend in a longitudinal direction of the wiper strip 600. A receiving groove 630 for receiving the two backing plates parallel to each other in the longitudinal direction extends on the base part 610. The two backing plates 700 corresponding to rectangular metal material plates having spring properties are received in two backing plate receiving grooves 630, respectively. A holding part 640 is a part for receiving the fasteners 511 and 521 in a sliding type.

The holding part 640 at one end of the wiper strip 600 shown in FIG. 3a is an open type capable of receiving the fasteners 511 and 521, but the other end shown in FIG. 3b is formed to restrict a longitudinal direction movement of the second fastener 521 of the second lever. That is, one of the second fasteners 521 of the second lever 520 is restricted by a wall of a slope 641 and a coupling part 642 provided only at the other end of the holding part 640. Further, the longitudinal direction movement of the second fastener 521 is restricted by a protrusion part 611.

The backing plate 700 applies elasticity and stiffness to the wiper lip part 620. When a pressurizing force is applied from the wiper arm, the pressurizing force is distributed to the wiper strip 600 through the lever assembly 500. At this time, the pressurizing force spreads in the longitudinal direction of the wiper strip 600 by the backing plate 700. Accordingly, the backing plate 700 should have elasticity and stiffness to maintain a shape of the wiper strip 600. The number of backing plates 700 and backing plate receiving grooves 630 may be two or more according to a degree of stiffness or elasticity of the wiper strip.

An embodiment of the wiper blade according to the present invention will be described.

<An Embodiment of the Wiper Blade According to the Present Invention>

Figure 4:
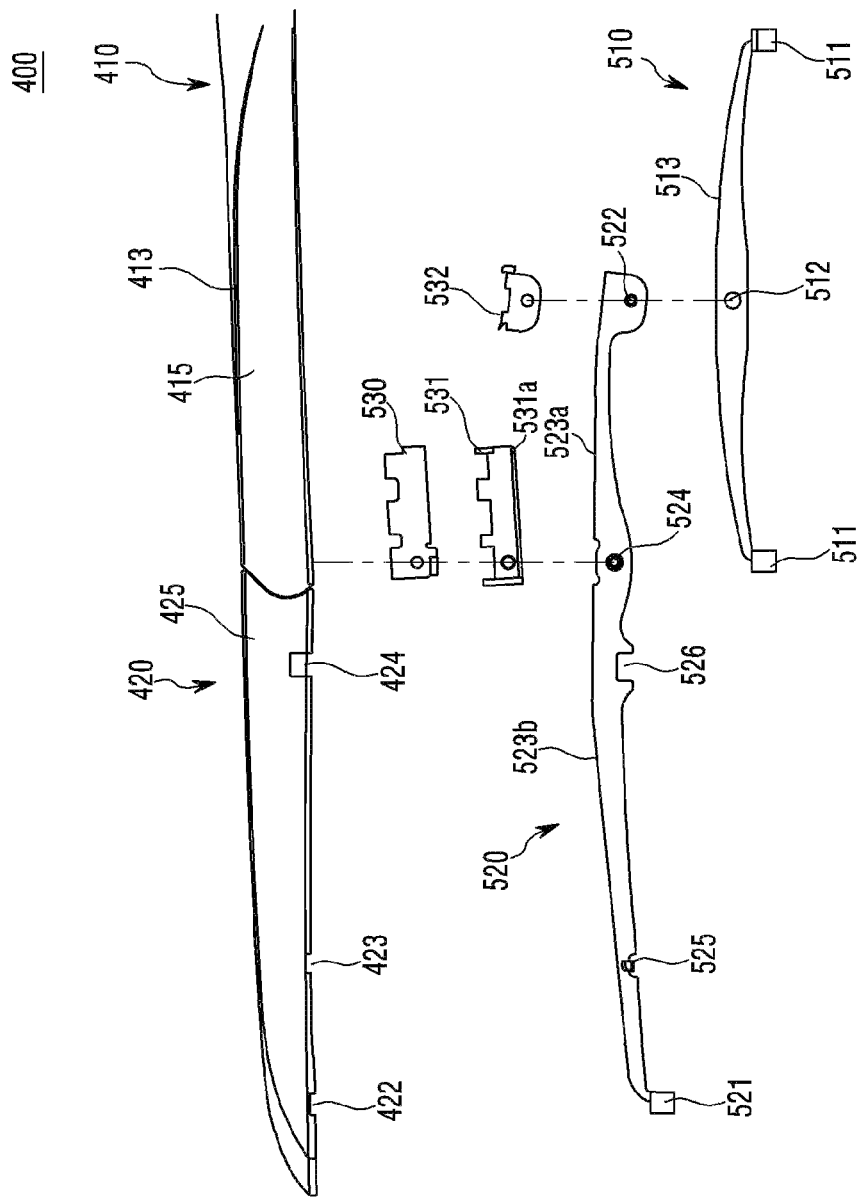
FIG. 4 is a front exploded view showing a cover part and a lever assembly of the wiper blade according to the present invention.

FIG. 4 is a front exploded view showing a cover and a lever assembly of the wiper blade according to the present invention.

Figure 5:
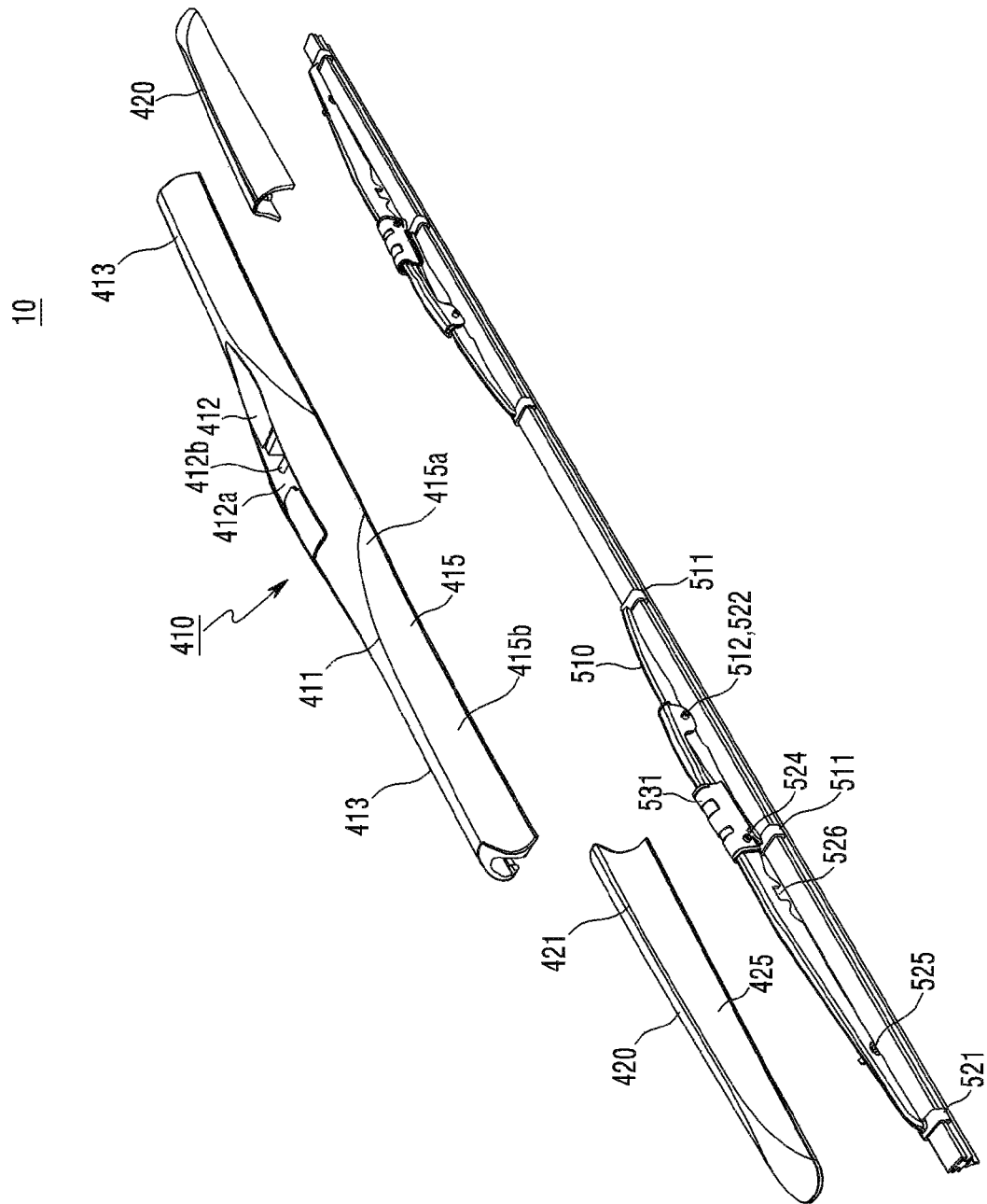
FIG. 5 is a perspective view of the cover part and the lever assembly of the wiper blade separated from each other according to the present invention.

FIG. 5 is a perspective view of the cover and the lever assembly of the wiper blade separated from each other according to the present invention.

Referring to FIGS. 1a, 1b, 4 and 5, according to an embodiment of the present invention, the lever assembly 500 includes a pair of first levers 510 and a pair of second levers 520 hinge-coupled to the first levers 510 and coupled to the cover part 400.

The first lever 510 is coupled to a wiper center directional front end of the second lever 520, and hinge-coupled to rotate about a coupling axis of the first lever 510.

According to the embodiment of the present invention, the first lever 510 may be provided at a position spaced apart from a center of the wiper blade 10 by a predetermined distance. One end of the second lever 520 is hinge-coupled to the first lever 510 and a central portion of the second lever 520 is coupled to the cover part 400. The other end of the second lever 520 supports the wiper strip 600. For example, it is possible to obtain a six-point support structure in which a pair of the first levers 510 supports four points and a pair of the second levers 520 supports two points. That is, each of the pair of the first levers 510 supports two points of the wiper strip 600. Each of the pair of the second levers 520 supports one point of the wiper strip 600. By doing this, the lever assembly 500 including a pair of the first levers 510 and a pair of the second levers 520 are able to as a whole support six points of the wiper strip 600.

When the wiper strip 600 is supported by the six-point support structure, the second lever 520 is able to sufficiently pressurize the end of the wiper strip.

In general, the longitudinal central portion of the backing plate 700 inserted into the wiper strip 600 is concavely curved separately from the glass surface 60a. For instance, when the lever assembly 500 is not able to pressurize both ends of the wiper strip 600, a pressurizing force given to the lever assembly 500 may not be distributed to the entire wiper strip 600. Therefore, for the purpose of stable wiping, the curvature of the backing plate 700 should be larger than that of the glass surface 30a. In other words, the curvature radius of the backing plate 700 should be smaller than that of the glass surface 30a.

However, according to the embodiment of the present invention, the six-point support structure of the lever assembly 500 is able to distribute, in a longitudinal direction of the wiper strip 600, the pressurizing force given to the lever assembly 500. Therefore, the curvature of the backing plate 700 may be smaller than that of the glass surface 30a or the backing plate 700 may have no curvature. It spends a lot of processing time to correctly adjust the curvature of the backing plate 700 in accordance with the pressurizing force applied to the wiper blade 10. The six-point support structure of the lever assembly 500 according to the embodiment of the present invention is able to stably distribute a load to the wiper strip 600 by using the backing plate 700 having a small curvature or no curvature.

Referring to FIGS. 1a and 1b to 5, the first lever 510 supports the base part 610 of the wiper strip 600. According to the embodiment of the present invention, the first lever 510 slidably supports the base part 610 of the wiper strip 600.

Referring to FIGS. 1a, 1b, 3a and 3b, the backing plate 700 may have a curvature in order to fit the curvature of the glass surface 30a. According to the embodiment, when the curvature of the wiper blade 10 is maintained by the first lever 510 and the second lever 520, the backing plate 700 may have no curvature. The lever assembly 500 and the cover part 400 distribute the pressurizing force applied from the wiper arm to the wiper strip 600.

Each of the pair of the first levers 510 includes two first fasteners 511, two first through holes 512 and two arm parts 513.

The first lever 510 is formed to have a mountain fold extending in a longitudinal direction by press-processing a metal plate. The first lever 510 is formed to have an arch shape of which a center is convex toward the cover part 400.

The first lever 510 is formed to have a U-shaped cross section which is opened to the lower portion thereof.

The first through hole 512 of the first lever 510 may be formed in the center of the first lever 510 for a hinge coupling to the second lever 520. The first through hole 512 is opened in a width direction of the first lever. The first through hole 512 is coupled to a second through hole 522 of the second lever 520 described below. A second spacer 532 is inserted between the first through hole 512 and the second through hole 522, so that the first through hole 512 and the second through hole 522 are more securely coupled to each other. The first fastener 511 for supporting the wiper strip 600 is formed in both ends of the first lever 510. The first fastener 511 slidably supports the wiper strip 600.

As a result, the lever assembly 500 according to the embodiment of the present invention is comprised of two symmetrical portions including the one first lever 510 and the one second lever 520. The second levers 520 are connected to each other through the cover part 400. That is, the cover part 400 formed of a resin material functions as a lever which may be commonly formed of a metallic material, so that the weight of the entire wiper blade 10 may be reduced. When the cover part 400 is formed of a resin material instead of a metallic material, the cover part 400 can be integrally formed, so that the number of parts can be reduced. Therefore, processes can be simplified and manufacturing costs can be reduced. Moreover, since the cover part 400 is formed of a resin material, the flexibility of the external appearance of the wiper blade 10 may be increased. With the increase of the flexibility of shape of the cover part 400, it is easier to transform the cover part 400 in order to prevent damages caused by traveling wind.

Figure 6:
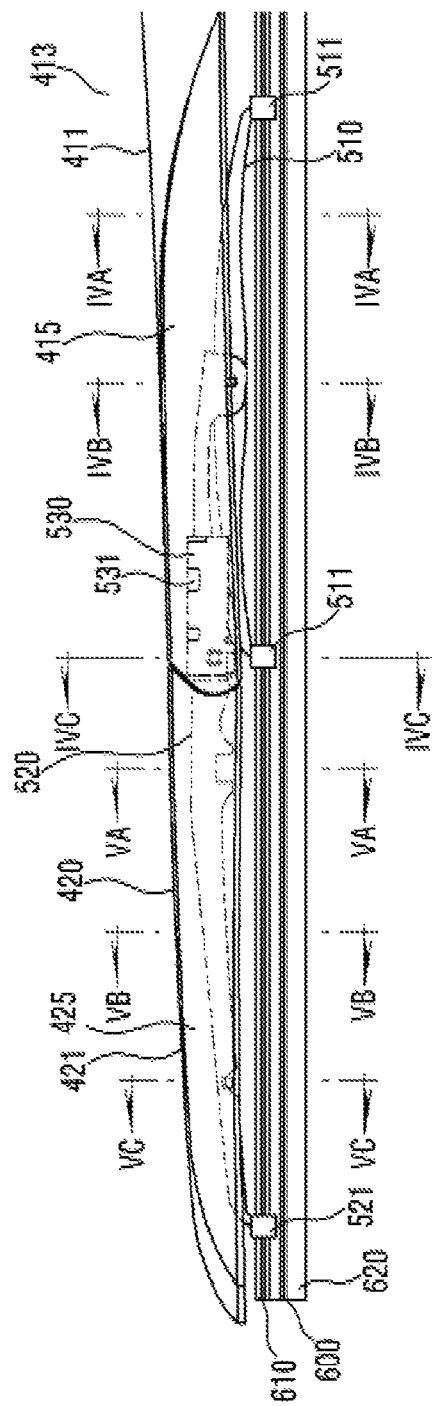
FIG. 6 is a perspective plan view of the cover part and the lever assembly of the wiper blade according to the present invention.

FIG. 6 is a front perspective plan view showing that the cover part 400 and the lever assembly 500 of the wiper blade 10 have been coupled to the wiper strip 600 of the wiper blade 10.

FIGS. 7a to 7f are axial directional cross-sectional views with respect to VC to IVA in FIG. 6.

Referring to FIGS. 7a to 7f, a transverse centerline of the first lever 510 is L2. The center of the transverse length of the upper portion of the second lever 520 corresponds to L2. Hereafter, L2 is referred to as a transverse centerline of the lever assembly 500. The transverse centerline L2 of the lever assembly 500 is offset from a transverse centerline L1 of the wiper strip 600. The first fastener 511 of the first lever 510 may have a yoke shape.

Figure 7A:
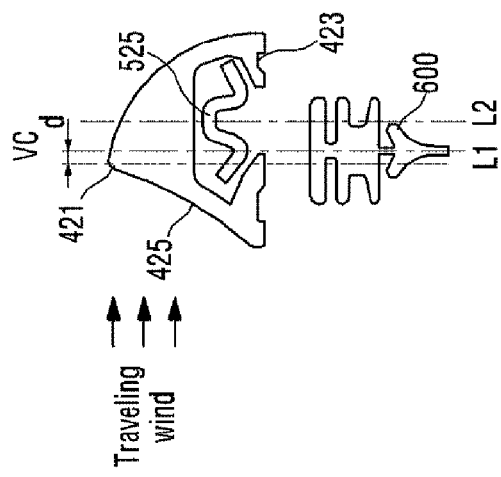
FIG. 7a is an axial directional cross-sectional view with respect to VC in FIG. 6.
Figure 7C:
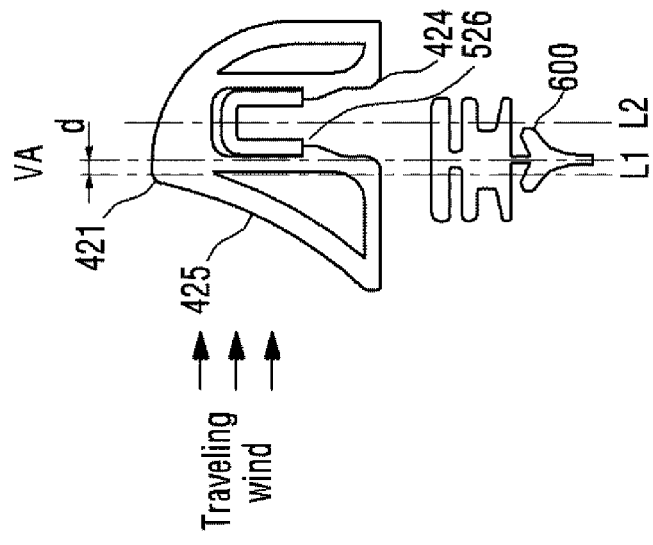
FIG. 7c is an axial directional cross-sectional view with respect to VA in FIG. 6.
Figure 7B:
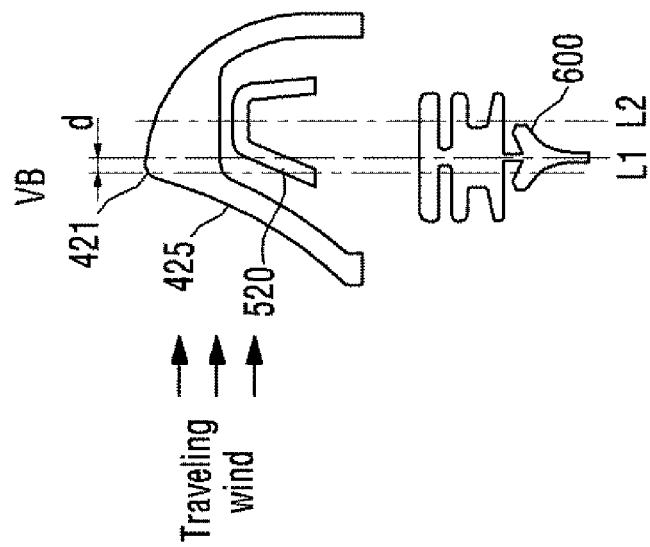
FIG. 7b is an axial directional cross-sectional view with respect to VB in FIG. 6.
Figure 7E:
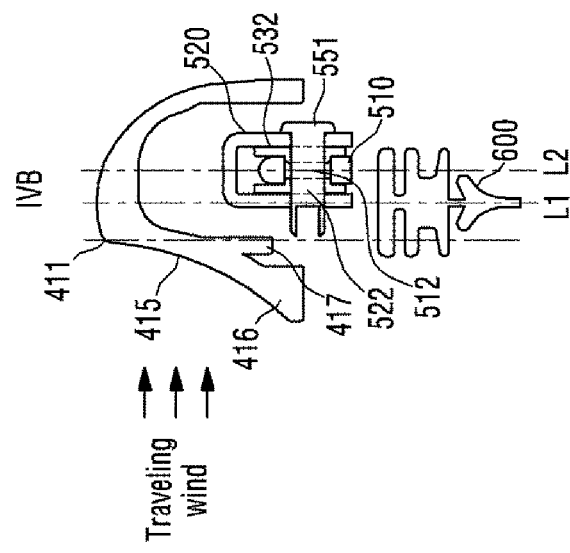
FIG. 7e is an axial directional cross-sectional view with respect to IVB in FIG. 6.
Figure 7D:
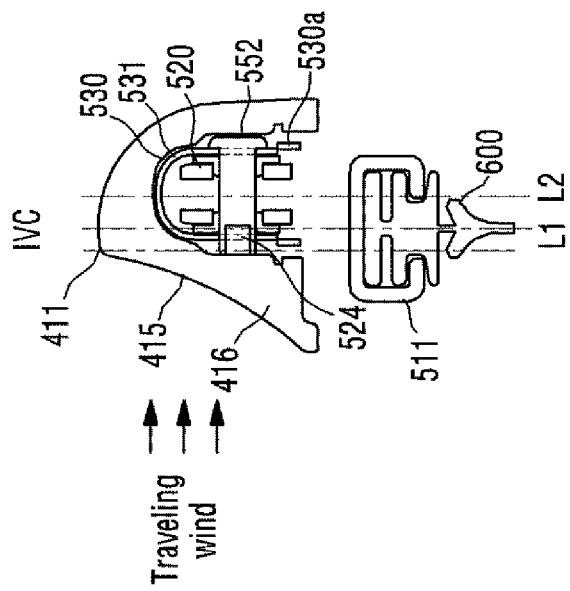
FIG. 7d is an axial directional cross-sectional view with respect to IVC in FIG. 6.

As the axial directional cross-section with respect to IVC of FIG. 6 is shown in FIG. 7d, the transverse centerline of the first fastener 511 corresponds to the transverse centerline L1 of the wiper strip 600.

As shown in FIGS. 4 and 5, the second lever 520 transfers the pressurizing force caused by the wiper arm 20 to the first lever 510. Further, the second lever 520 supports the wiper strip 600. The second lever 520 is coupled to the cover part 400 to maintain a whole shape of the wiper blade 10.

Each of a pair of the second levers 520 includes the second fastener 521 for supporting the wiper strip 600, the second through hole 522 for a hinge coupling to the first lever 510, two arm parts 523a and 523b, a third through hole 524 for the coupling to a central cover (fixing cover) 410, a first connection groove 525 and a second connection groove 526 for the coupling to a side cover (moving cover) 420 of the cover part 400.

The second lever 520 is formed in an arch shape toward the cover part 400. The second lever 520 is formed to have a U-shaped cross section which is opened to the lower portion thereof. Accordingly, the central directional arm part 523a of the second lever 520 may receive a portion of the first lever 510. Since the lower portion of the cross section of the second lever 520 and the cross section of the first lever 510 have all U-shape, it is possible to reduce a gap between the first lever 510 and the second lever 520 when a portion of the first lever 510 is received in the second lever 520. As a result, a wiping performance can be maintained satisfactory by causing the wide blade 10 to contact more closely with the glass surface.

The arm part 523 includes the wiper central directional arm part 523a and the front end directional arm part 523b. The wiper central directional arm part 523a of the second lever 520 has the second through hole 522 formed therein and is hinge-coupled to the first lever 510. The second through hole 522 may be formed in one end of the second lever 520.

As shown in FIG. 7e, a first connecting pin 551 passes through the first through hole 512 and the second through hole 522 and then couples the first lever 510 to the second lever 520. Also, as shown in FIG. 7d, a second connecting pin 552 passes through the third through hole 524 and then couples the second lever 520 to the cover part 400.

The first connection groove 525 and the second connection groove 526 for the coupling to the cover part 400, and the second fastener 521 for supporting the wiper strip are formed in the front end directional arm part 523b of the second lever 520. Though not shown, similarly to the first fastener 511 of the first lever 510, a transverse centerline of the second fastener 521 corresponds to the transverse centerline L1 of the wiper strip 600. The second fastener 521 may have a yoke shape. Further, the third through hole 524 for the hinge coupling to the cover part 400 is formed in the second lever 520.

As shown in FIG. 4, the second lever 520 may further include a first spacer 531 and a spacer clip 530 in order to be coupled to the cover part 400. A rib 530b is formed at the outside of the lower portion of the spacer clip 530 in the longitudinal direction of the central cover 410. Regarding the spacer clip 530, the rib 530b may be coupled to a slot 413a of the central cover 410 in a sliding manner. When the rib 530b is coupled to the slot 413a of the central cover 410, an elastic latch 530a is caught by the end portion of the slot 413a so that the backward movement of the spacer clip 530 is restrained and the coupling is strengthened.

As shown in FIGS. 4, 5 and 7d, the first spacer 531 is provided at a position where the third through hole 524 of the second lever 520 is located, and the spacer clip 530 is provided between the first spacer 531 and the central cover 410. The first spacer 531 not only strengthens the hinge-coupling structure between the second lever 520 and the cover part 400, but causes the wiper strip 600 to more closely contact with the glass surface 30a by more pressurizing the second lever 520. The spacer clip 530 has an arch-shaped transverse cross section and is rectangularly formed to surround the first spacer 531 in the longitudinal direction thereof. A rib 530b is formed at the outside of the lower portion of the spacer clip 530 in the longitudinal direction of the central cover 410.

Regarding the spacer clip 530, the rib 530b may be coupled to the slot of the central cover 410 in a sliding manner. The spacer clip 530 allows the central cover 410 to be stably coupled to the second lever 520. The first spacer 531 and the spacer clip 530 integrally move, and as a result, the second lever 520 is able to easily pivot. The first spacer 531 made of a resin material is capable of preventing abrasion caused by friction between the spacer clip 530 and the second lever 520 made of a metallic material, and of causing the spacer clip 530 to more pressurize the second lever 520.

The second spacer 532 is inserted into a portion where the first lever 510 and the second lever 520 are hinge-coupled, thereby strengthening the coupling of the second lever 520 and the first lever 510.

As shown in FIGS. 4 and 5, the third through hole 524 and the first fastener 511 located at the front end of the first lever 510 may be formed separately from the front end of the wiper blade 10 by the same distance. That is, a pivot axis of the second lever 520 is on the same line with the first fastener 511 located at the front end of the first lever 510. If the third through hole 524 is closer to the front end than the first fastener 511, an excessive load is distributed to the second fastener 521 and a relatively less load is distributed to the first fastener 511. Accordingly, the first fastener 511 is not able to give a predetermined pressure to the glass surface, so that a wiping performance of the first fastener 511 is degraded. On the contrary, if the first fastener 511 is closer to the front end than the third through hole 524, a load is not sufficiently transferred to the second fastener 521, so that a wiping performance of the second fastener 521 is degraded. However, there is no limit to this. A longitudinal length of the first lever 510, i.e., a distance between the first fasteners 511 can be controlled according to the curvature of the glass surface of a vehicle.

Here, a plurality of the first fasteners 511 of the first lever 510 and the fastener 521 of the second lever may support the wiper strip 600 at an equal interval. In this case, a pressurizing force applied to the fastener 521 of the second lever 520 is greater than a pressurizing force applied to the fastener 511 of the first lever 510. Therefore, in the wiping of the wiper strip 600, efficient wiping is obtained by preventing the lifting and chattering of the wiper.

Referring to FIG. 6, the cover part 400 receives the lever assembly 500 and distributes the pressurizing force from the wiper arm to the lever assembly 500, thereby causing the wiper strip 600 to more closely contact with the glass surface 30a.

As shown in FIGS. 4, 5, and 6, the cover part 400 includes the central cover 410 and the two side covers 420. The covers 410 and 420 include finned sections 415 and 425 according to the present invention. Upper front ends of the finned sections 415 and 425 of the cover part 400 are comprised of an upper front end 411 of the central finned section 415 formed in the central cover 410 and an upper front end 421 of the side finned section 425 formed in the side cover 420.

The side covers 420 are located in both ends of the central cover 410, respectively. The central cover 410 and the side cover 420 are made of a resin material respectively and have a predetermined rigidity.

Further, the central cover 410 and the side cover 420 are coupled to each other to configure the cover part 400, and the cover part 400 extends in a longitudinal direction of the wiper blade 10. A length of the longitudinal direction of the cover part 400 is greater than a length of a longitudinal direction of the lever assembly 500. The cover part 400 together with the wiper strip 600 forms an integrally external appearance.

Referring to FIGS. 7a to 7e, the entire cross section of the second lever 520 including the first connection groove 525, the front end directional arm part 523b and the second connection groove 526 has a lower space having a trapezoidal shape. Therefore, when the wiper blade 10 wipes the glass surface of a vehicle, durability of the wiper blade 10 is enhanced with respect to a torsional moment transferred to the wiper blade 10 in accordance with the change of the wiping direction.

Figure 8A:
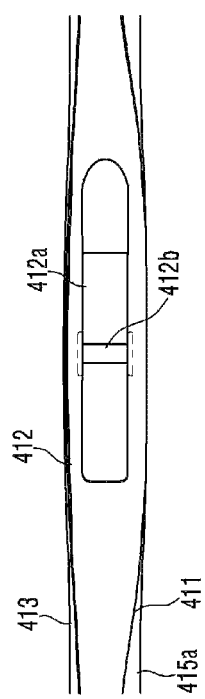
FIG. 8a is a top view of a connection holder of the wiper blade according to the present invention.

FIG. 8a is a top view of a connection holder part of the wiper blade according to the present invention.

FIG. 8b is a front view of the connection holder part of the wiper blade according to the present invention.

FIG. 8c is an exploded perspective view of the connection holder part of the wiper blade according to the present invention.

Referring to FIGS. 1a, 1b, 2a, 2b 4, 5, 8a, 8b and 8c the central cover 410 includes a connection holder part 412 for a connection with the wiper arm 20, a pair of first lever covers 413 and a pair of the central finned sections 415. Each of the pair of the central finned sections 415 has the central finned section upper front end 411 formed therein.

As shown in FIG. 5, the connection holder part 412 is located approximately in a center of the central cover 410, a lower portion of the connection holder part 412 does not receive the lever assembly 500, and an opening 412a for the coupling to the wiper arm or the adaptor part 200 as shown in FIGS. 2a and 2b may be formed in the connection holder part 412.

The lever cover 413 is disposed in both ends of the connection holder part 412 so as to cover the entire first lever 510.

The central cover 410 is formed to have the arch shape convex toward the wiper arm, thereby causing the wiper strip 600 to indirectly contact more closely with the glass surface of a vehicle by applying an external force to the lever assembly 500.

As shown in FIGS. 5, 8a, 8b, and 8c, the connection holder part 412 does not receive the lever made of a metallic material therein, so that a degree of freedom of a shape is increased. That is, it is easy to form the finned section in the connection holder part 412. In other words, the external shape of the connection holder part 412 may include a connection holder part finned section 415a in such a manner as to efficiently distribute a pressurizing force to the entire wiper blade 10 in accordance with traveling wind when the vehicle is driven. The connection holder part finned section 415a distributes air flows to the front end of the cover part 400 to prevent the wiper blade 10 from lifting.

Figure 7F:
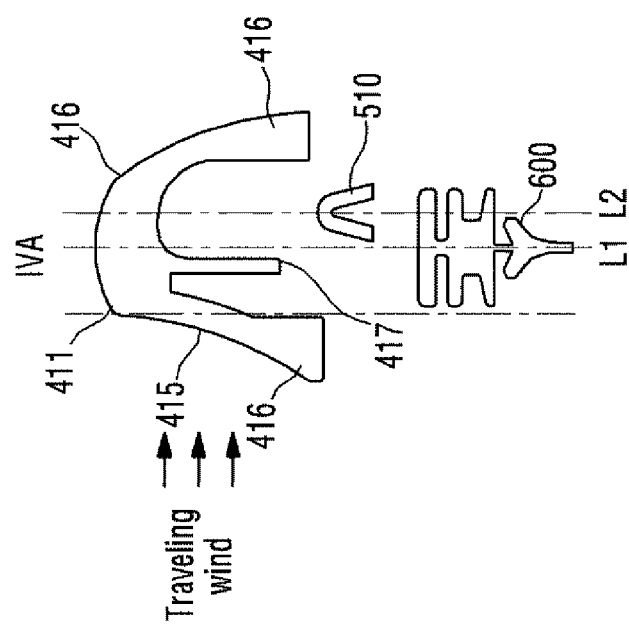
FIG. 7f is an axial directional cross-sectional view with respect to IVA in FIG. 6.

Referring FIGS. 7d, 7e, and 7f, a thickened portion 416 is installed in each internal vertex of the cross section of the central cover 410. Accordingly, the central cover 410 increases resistance to a torsional moment and rigidity. A rib 417 is provided within the central cover 410 in order to prevent a gap between internal structures.

The rib 417 is formed within the central cover 410 and reduces a gap between the central cover 410 and the first lever 510 received in the central cover 410. As a result, the lateral movement of the first lever 510 is limited and thus the wiping is stably performed.

Referring to FIGS. 8a and 8c, the connection holder part 412 is formed to have parallel walls, and the transverse center of the connection holder part 412 corresponds to the transverse centerline L1 of the wiper strip 600. A vehicle front exterior of the connection holder part 412 may include the connection holder part finned section 415a in a lower portion thereof. An upper front end of the connection holder part finned section 415a forms a portion of a curve which starts from the lower portion of the connection holder part 412 and meets the central finned section upper front end 411, i.e., the upper front end of the cover part 400 with the approach to both ends of the wiper blade 10. Accordingly, the central finned section 415 formed in the central cover 410 forms a finned section formed integrally with the first lever cover 413 and the connection holder part 412, and makes it easier to transfer a pressurizing force caused by traveling force to the entire cover part 400.

The adaptor part (not shown), which can be coupled to the connector (not shown), may be provided within the connection holder part 412 in a front side of the vehicle. The edge of the opening 412a of the connection holder part 412 may have a curvature and transfers stress concentrated on the opening 412a of the connection holder part 412 to the first lever cover 413 of the central cover 410.

Referring to FIG. 8a, the connection holder part 412 is rotatably connected to the front end of the wiper arm through a connection clip 412b.

The connection clip 412b is a component used to connect the connection holder part 412 with the connector (not shown). The connection clip 412b of the present invention is made of a flexible material which is tougher than a conventional material. Since the connection clip 412b is made of a tougher material, the connection clip 412b can be prevented from being damaged by friction between the wiper arm and the connection clip 412b. When the wiping is performed, the most torsional moment and stress caused by torsion are applied to the connection clip 412b. Therefore, the tough and flexible material is used as a material of the connection clip 412b, thereby improving resistance to the torsional moment and stress which are applied to the connection holder part. The connection clip 412b is more flexible than the cover part 400. Therefore, even though the connection clip 412b is inserted into the inside of the connection holder part 412, the connection holder part 412 is not projected. Accordingly, the external appearance is not affected, and thus integrality of the shapes of the finned sections 415 and 425 can be maintained. As a result, the connection clip 412b is able to function to reinforce the rigidity of the cover part 400 when the cover part 400 is made of a resin material.

Referring to FIGS. 4, 5, 7e, 7f, 8a, 8b and 8c, the first lever covers 413 are located in both ends of the central cover 410 and extend in the longitudinal direction of the wiper blade 10. The first lever cover 413 has an opening in the lower portion thereof, and the opening is formed to have a U-shape to receive the first lever 510. The central directional arm part 523a of the second lever 520 receives a portion of the first lever 510. The first lever cover 413 receives the central directional arm part 523a of the second lever 520. The central finned section 415 of the central cover 410 includes the connection holder part finned section 415a formed in the connection holder part and a first lever cover finned section 415b formed in the first lever cover 413. The connection holder part finned section 415a and the first lever cover finned section 415b integrally form the central finned section 415. The connection holder part finned section 415a is formed in the connection holder part 412 of the wiper blade 10 and distributes traveling wind from a front side of the vehicle from side to side. The connection holder part finned section 415a extends from the lower portion of the connection holder part 412 to both front ends of the wiper blade 10. The first lever cover finned section 415b is formed in the first lever cover 413 and causes the traveling wind to flow from side to side or upward.

The first lever cover 413 is integrally formed with the central finned section 415. The central finned section 415 generating a pressurizing force pressurizing the wiper strip 600 against the glass surface 30a by receiving the traveling wind applied to a vehicle being driven is formed to be inclined.

Referring to FIGS. 4, 5, 6, 7a, 7b and 7c, the side cover 420 receives at least a portion of the second lever 520. The side cover 420 has an opening in a lower portion thereof. The opening is formed to have a U-shape to receive the second lever 520. As shown in FIGS. 7a, 7b and 7c, an upper front end 421 of the side finned section 425 is offset at a predetermined distance to a transverse one side of the transverse centerline L1 from the transverse centerline L1 of the wiper strip 600.

The side cover 420 includes the side finned section 425 extending from the finned section 415b of the first lever cover 413. The side cover 420 receives the front end directional arm part 523b of the second lever 520.

The side finned section 425 is formed concave toward the wiper strip 600 from the side finned section upper front end 421 offset from the transverse centerline of the wiper blade 10. The inner lower portion of the side cover 420 should have a space for receiving the second lever 520. Therefore, the inner lower portion of the side cover 420 should have should have a predetermined depth in such a manner as to receive the second lever 520. When the side finned section upper front end 421 is formed on the rear side of the vehicle, the depth of the receiving space formed in the inner lower portion of the side cover 420 becomes smaller, and thus the second lever 520 cannot be completely received. In the embodiment of the present invention, the side finned section upper front end 421 is offset from the transverse centerline L1 of the wiper strip 600 in a front direction of the vehicle such that the second lever 520 is completely received and prevented from being shaken, so that the wiping can be stably performed.

Also, as shown in FIGS. 7a to 7c, the offset "d" of the side finned section 425 is maintained constant along the front end of the side cover 420. Accordingly, the traveling wind flows in a top direction of the wiper blade 10. As a result, the lifting and chattering of the wiper blade 10 are prevented.

That is, when a vehicle is driven, the traveling wind flows from the central portion of the wiper blade 10 to the right and left and upper side of the cover part 400 along the finned sections 415 and 425. As a result, the upper front ends 411 and 421 of the finned sections 415 and 425 are offset from transverse centerline L1 of the wiper blade 10 to the front side of the vehicle, so that even though the transverse lengths of the finned sections 415 and 425 are relatively small, the wiper blade 10 maintains an excellent wiping performance.

Referring to FIG. 4, the side cover 420 includes a support protrusion 422 supporting the second lever 520. An upper portion of the second fastener 521 of the second lever 520 is supported by the support protrusion 422 of the side cover 420. The support protrusion 422 prevents transformation due to a moment of the second lever 520 by preventing the second fastener 521 of the second lever 520 from rotating in a direction of the side cover 420. Further, the side cover 420 includes a first coupling protrusion 423 and a second coupling protrusion 424 which integrally couple the second lever 520 with the side cover 420 and prevent the second lever 520 from being separated from the side cover 420.

Referring to FIGS. 4, 5, 7a, 7b and 7c, the side finned section 425 is integrally formed with an upper portion surface of the side cover 420. More specifically, the finned section 425 is implemented by a shape change of the upper portion surface of the side cover 420. The finned section 425 functions to induce an air flow such that air moving to a glass side of the vehicle pressurizes the side cover 420 in a direction closer to the vehicle glass 30 when the wiping is performed.

Referring to FIGS. 7a to 7c, the first coupling protrusion 423 may be formed to protrude inwardly in a bottom of the side cover 420 and may form a space for receiving the second lever 520. A lower end of the first connection groove 525 of the second lever 520 may be formed to be outwardly bent in order to be coupled to and received in the formed space. Accordingly, the first connection groove 525 is caught by the first coupling protrusion 423, and thus the second lever 520 is prevented from being separated from the side cover 420. As shown in FIGS. 7b and 7c, a transverse width of the front end directional arm part 523b of the second lever 520 is greater than a transverse width of the second connection groove 526. That is, the second coupling protrusion 424 of the side cover 420 is elastically coupled to the second lever 520 by transversely pressurizing the second connection groove 526 of the second lever 520, and prevents the second lever 520 from being separated from the side cover 420.

Adaptor Part

Embodiments of the adaptor part according to the present invention will be described.

EMBODIMENT

Figure 9A:
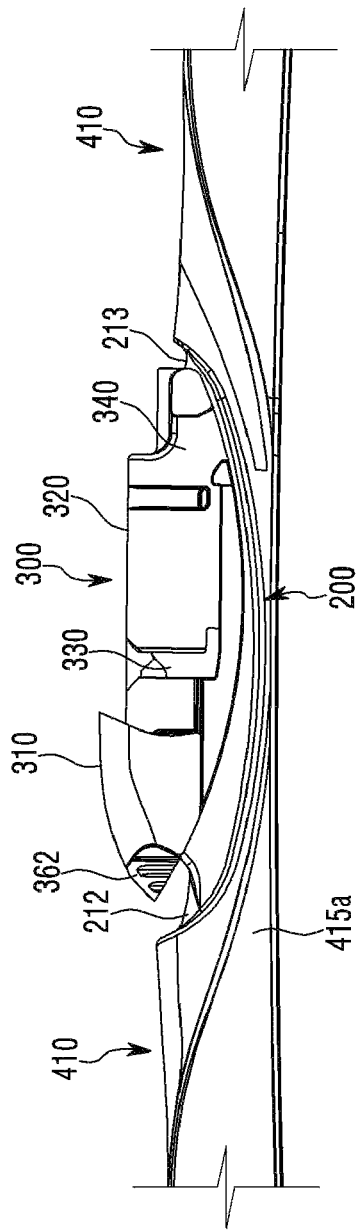
FIGS. 9a and 9b are a front view and a perspective view respectively of the wiper blade in which a cover of the connector is located at a fixing position in accordance with the present invention.
Figure 9B:
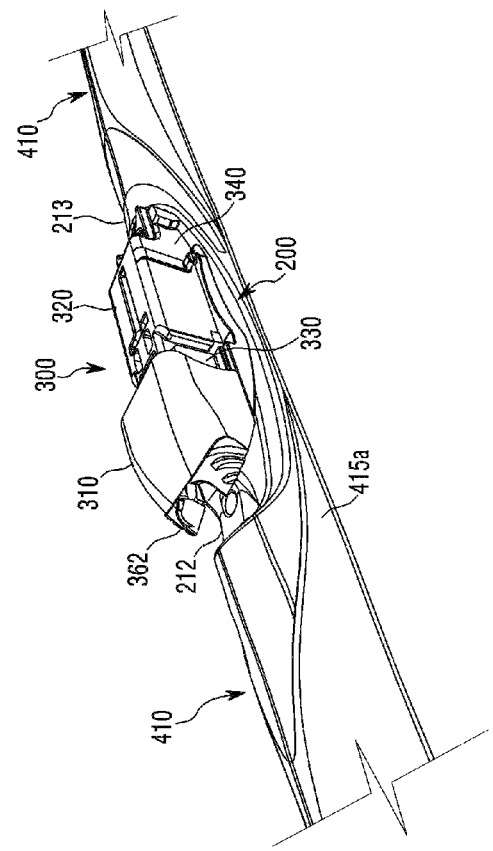
Figure 9C:
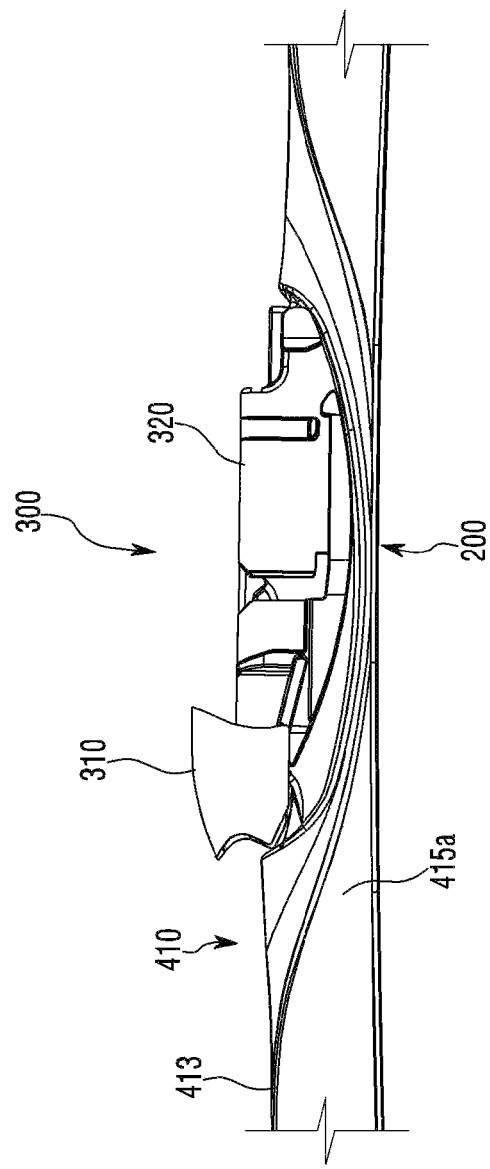
FIGS. 9c and 9d are a front view and a perspective view respectively of the wiper blade in which the cover of the connector is located at a release position in accordance with the present invention.
Figure 9D:
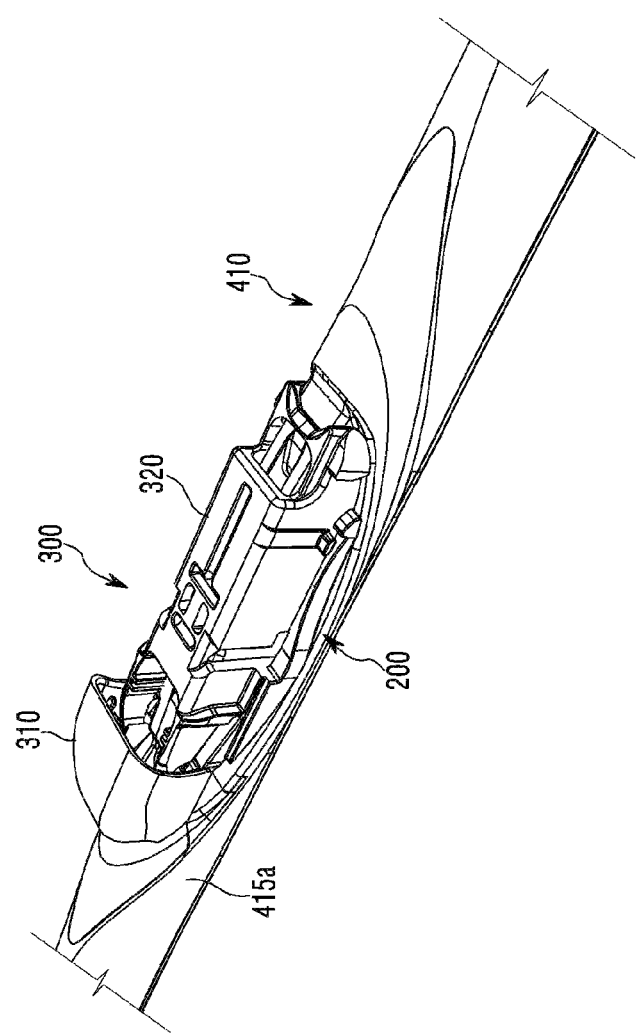

FIGS. 9a and 9b are a front view and a perspective view respectively showing that a cover of the connector coupled to the wiper blade according to the present invention is located at a fixing position. FIGS. 9c and 9d are a front view and a perspective view respectively showing that the cover of the connector coupled to the wiper blade according to the present invention is located at a release position.

Referring to FIGS. 9a to 9d, the connector 300 includes a body 320 by which the wiper arm is caught, and the cover 310 which is able to move to the fixing position for fixing the wiper arm caught by the body 320 and to the release position for releasing the fixed wiper arm.

Figure 10A:
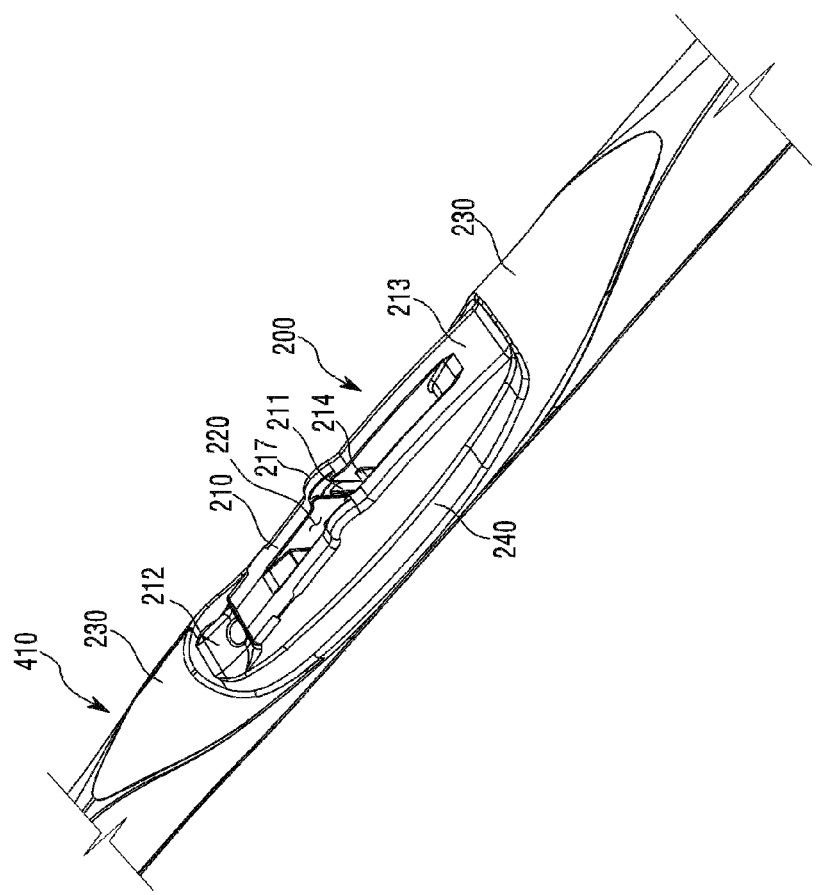
FIG. 10a is a perspective view of the adaptor of the wiper blade according to the present invention.
Figure 10B:
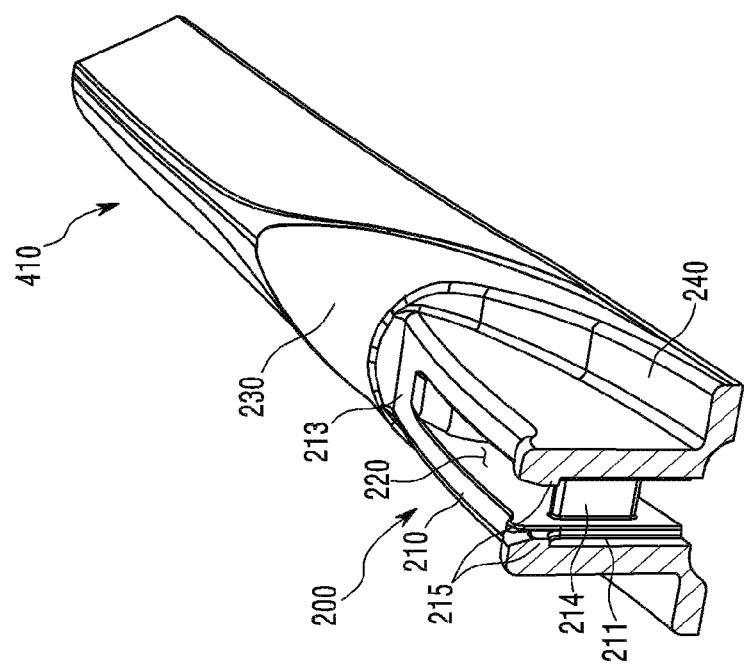

FIG. 10a is a perspective view showing the embodiment of the adaptor of the wiper blade according to the present invention. FIG. 10b is a sectional perspective view of the wiper blade according to the present invention. FIG. 10c is a plan view of the wiper blade according to the present invention as viewed from the top.

Referring to FIGS. 9a to 9d and 10a to 10c, the adaptor part 200 according to the present invention includes a central portion 210 and front ends 230 formed on both front ends of the central portion 210. A protrusion receiving recess 220 in which a lower protrusion (not shown) of the connector 300 is received is formed in the central portion 210. The inside of the protrusion receiving recess 220 includes a fitting recess 211 in which a fitting part (not shown) of the connector 300 is inserted, a central connection portion 214 which is received in the central connection recess (not shown) of the connector 300, a release point 212 of the cover 310 when the cover 310 is located at the release position, and a support 213 which supports the lower portion of the body 320 of the connector 300. Also, an opening 216 extending through the central portion 210 of the adaptor part 200 may be formed in the central portion 210 in order to allow impurities, rainwater and the like to be discharged. Accordingly, it is possible to prevent frost that interferes with the pivot between the adaptor part 200 and the connector 300 and to prevent the impurities, etc., from accumulating.

The adaptor part 200 is formed in a concave part 240 located approximately in the center of the connection holder part 412 of the cover part 400. It is preferable that the concave part 240 is formed in a trapezoidal shape of which the width becomes narrower toward the wiper strip 600 in such a manner that the connection holder part finned section 415a, i.e., a portion of the central finned section 415 of the wiper blade is connected to the lower portion of the connection holder part 412. However, the shape of the concave part 240 is not limited to the trapezoidal shape. The concave part 240 may be formed in a U-shape. A bottom surface of the adaptor part 200 is formed to fit the shape of the concave part 240.

As shown in FIGS. 5 and 8b, the connection holder part 412 includes the finned section 415a extending toward both front ends of the wiper blade 10 from the lower portion thereof. The connection holder part finned section 415a, together with the first lever cover finned section 415b formed in the first lever cover 413, forms the central finned section 415 of the central cover 410. When the vehicle is driven, the connection holder part finned section 415a distributes a pressurizing force to the entire wiper blade 10 by causing the pressure of traveling wind applied to the wiper blade to flow right and left.

Accordingly, the adaptor part 200 is formed in the connection holder part 412 including the finned part 415a. Further, since the adaptor part 200 is integrally formed with the cover part 400, the adaptor part 200 is made of the same resin material as that of the cover part 400.

FIG. 10b is a transverse cross-sectional view of the adaptor part 200 shown in FIG. 10a.

As shown in FIG. 10b, the central portion 210 may be comprised of a pair of plate-shaped members which faces each other with an axis corresponding to a transverse center of the wiper blade and protrudes parallel to each other. The release point 212 of the cover 310 when the cover 310 is located at the release position, and the support 213 which supports the body 320 are formed on both ends of the central portion 210. The fitting recess 211 and the central connection portion 214, which are for the coupling to the connector 300, are formed in the center of the central portion 210. Also, a pivot guide 217 which guides the pivot of the connector when the wiping is performed is formed in the center of the central portion 210. The central portion 210 is formed to be symmetrical with respect to the transverse center of the wiper blade 10.

The release point 212 and the central connection portion 214 are formed to be symmetrical with respect to the transverse center of the wiper blade 10 respectively. The central connection portion 214 is coupled between the both side walls of the cover part 400, so that the inner width of the cover part 400 of the wiper blade 10 is prevented from being reduced. The fitting recess 211 is formed in the center of the wiper blade 10 in the longitudinal direction of the wiper blade 10 such that the fitting part (not shown) of the connector 300 is elastically caught by the fitting recess 211.

The pivot guide 217 is formed to correspond to the lower portion of the connector 300. That is, the pivot guide 217 is formed convex toward the lower portion of the connector 300, and the lower portion of the connector 300, which comes in contact with the pivot guide 217, is formed concave toward the adaptor part 200. The pivot guide 217 and the lower portion of the connector 300 will be described later.

The front end 230 is formed at both ends of the adaptor part 200 and contacts with the release point 212 and the support 213 respectively. The front end 230 may be formed to maintain a certain height from the connection holder part 412.

Next, an embodiment of the connector will be described.

Prior to the description of the embodiment of the connector, a shape of the wiper arm which can be connected to the connector according to the present invention will be described.

FIGS. 9a and 9b are views showing connection states of the wiper arm applied to the embodiment of the present invention.

Figure 11A:
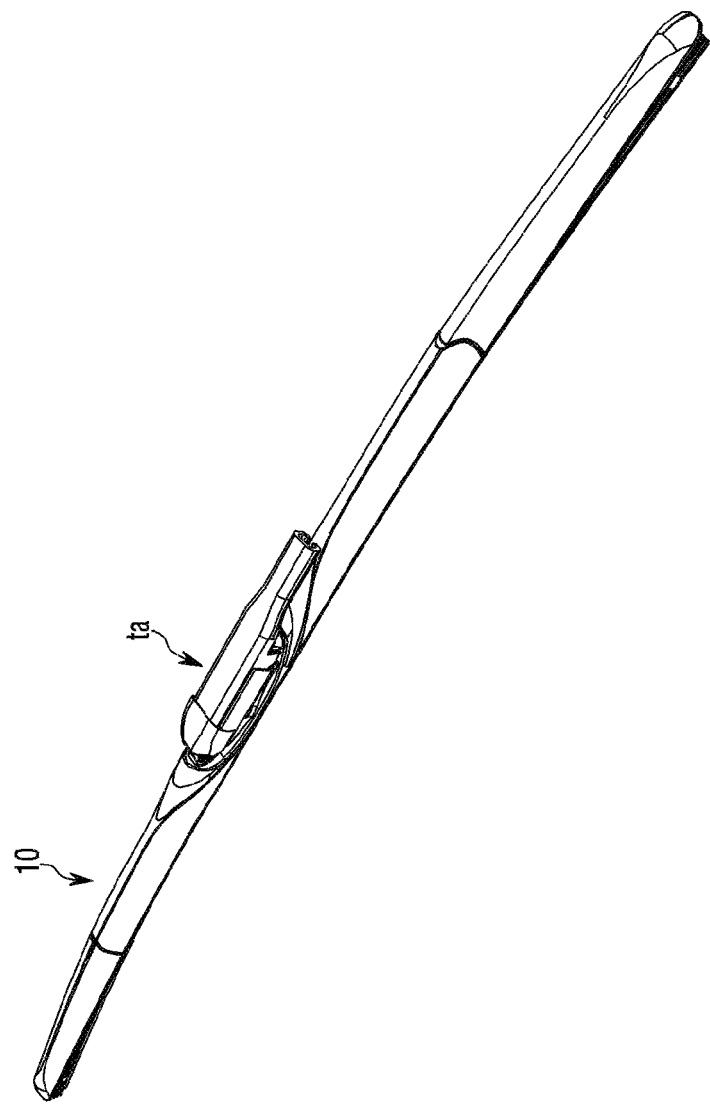
FIGS. 11a and 11b are perspective views showing the wiper blade assembly to which the connector has been coupled according to the embodiment of the present invention.
Figure 11B:
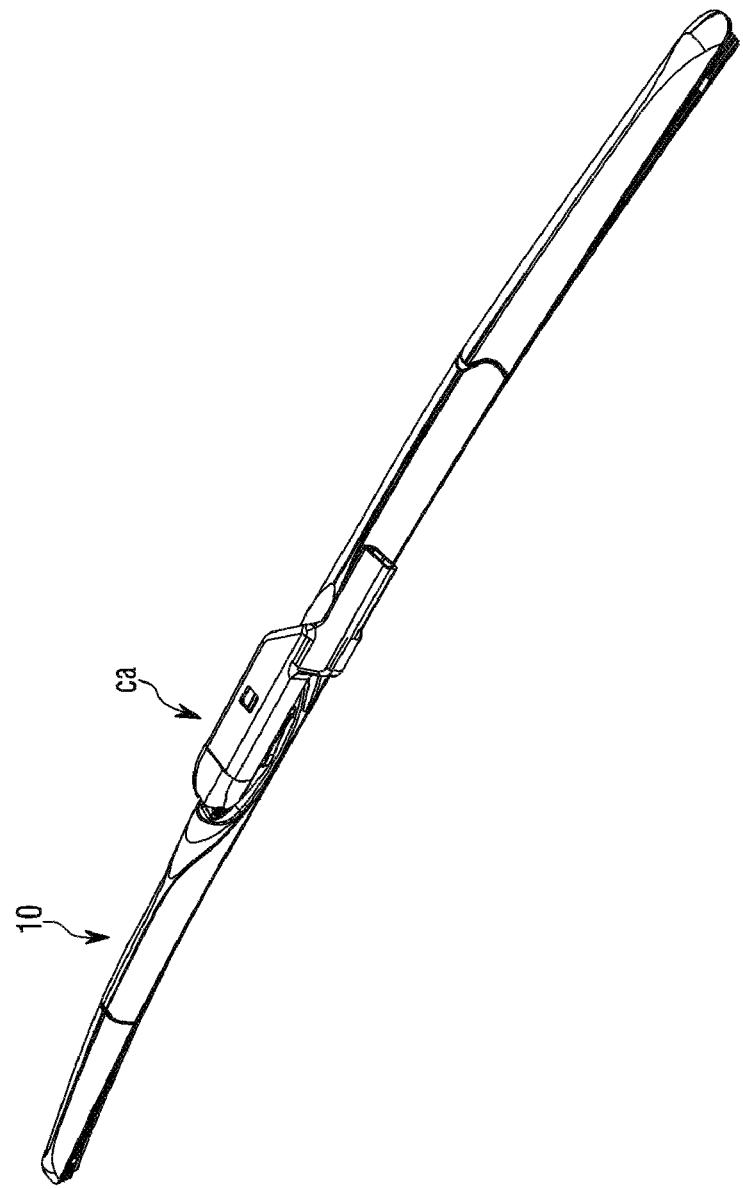

FIG. 11a is a partial perspective view showing a state where the connector according to the present is coupled to the wiper arm including a tap which is formed in the wiper arm and contacts with the top surface and both sides of the connector and extends toward the cover part. FIG. 11b is a partial perspective view showing a state where the connector according to the present is coupled to the wiper arm including a cap which contacts with the top surface and both sides of the connector.

As shown in FIGS. 11a and 11b, the wiper blade 10 for a vehicle is attachably and removably provided to the wiper arm which is connected to a driving source of a vehicle body, transfers rotation power and has a predetermined length. The connector 300 is mounted to the wiper blade shown in FIGS. 2a and 2b, and then the wiper arm shown in FIGS. 11a and 11b may be coupled to the connector 300. The adaptor part 200 is installed within the connection holder part 412, so that the adaptor part 200 may be assembled with various types of driving arms together with the connector to be described below.

Connector

First Embodiment

Figure 12B:
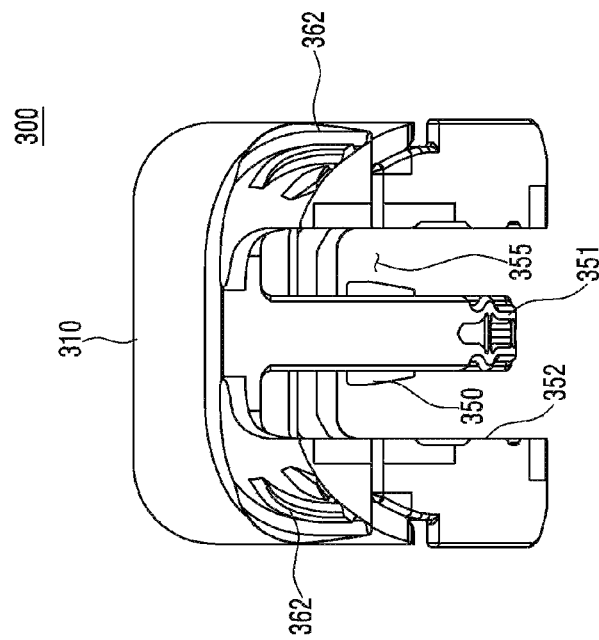
FIG. 12b is a side view of the connector according to the present invention as viewed from the cover.
Figure 12A:
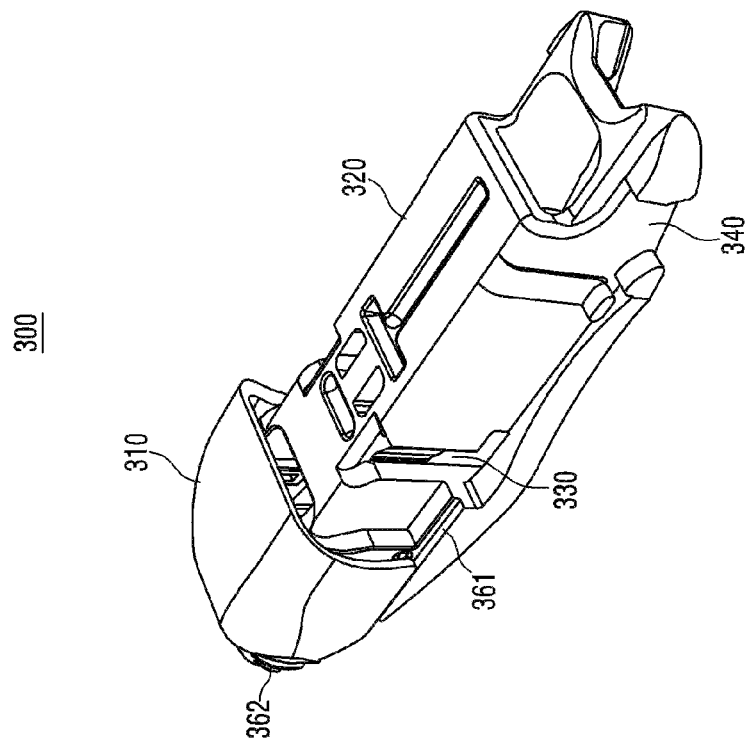
FIG. 12a is a perspective view of the connector according to the present invention.
Figure 12D:
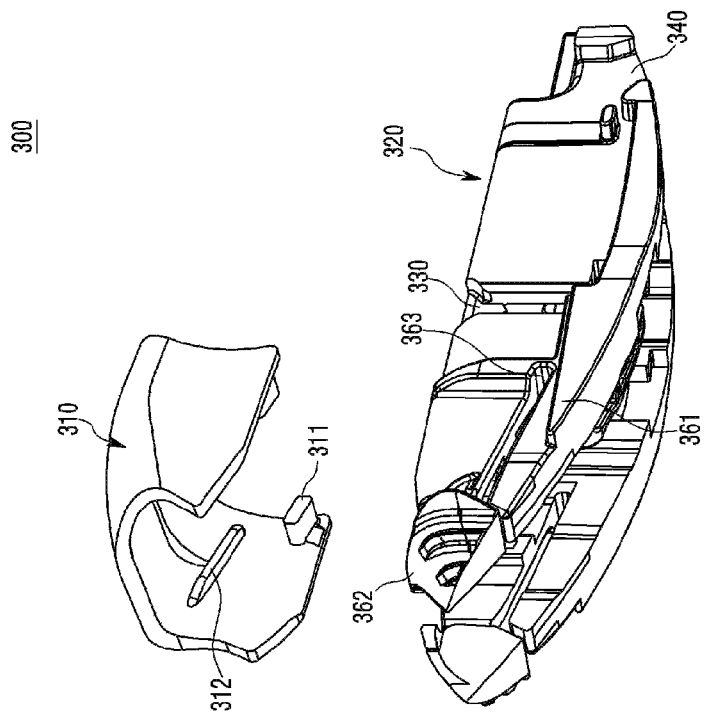
FIG. 12d is a perspective view showing that the cover and body of the connector according to the present invention have been separated from each other.
Figure 12C:
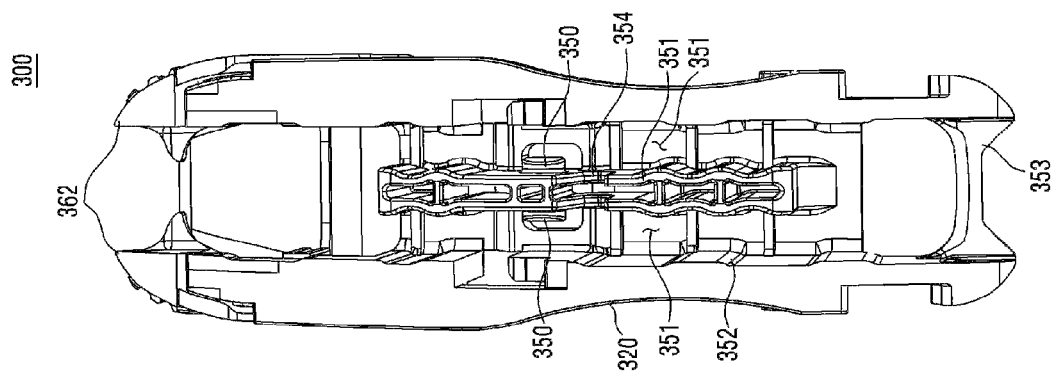
FIG. 12c is a bottom view of the connector according to the present invention as viewed from the bottom.

FIGS. 12a to 12d show the connector 300 which is mounted on the adaptor part 200. Referring to FIGS. 10a and 12c, the lower portion of the connector 300 is open to be coupled to the adaptor part 200. Referring to FIGS. 12a to 12d, the connector 300 includes the body 320 and the cover 310. The body 320 includes a pair of elastic moving pieces 362 which is formed on one end of the body 320 and faces each other, and one or more coupling parts 330 and 340 which are formed on both sides of the body 320 and by which the wiper arm is caught. The cover 310 is movable to the fixing position for fixing the wiper arm caught by the body 320 and to the release position for releasing the fixed wiper arm.

Referring to FIGS. 12a to 12d, the body 320 includes a fitting part 350 for the coupling to the adaptor part 200. The body 320 may include a first coupling part 330 and a second coupling part 340. The first coupling part 330 and the second coupling part 340 may be selectively connected to a wiper arm (ta) including a tap which contacts with the top surface and both sides of the connector shown in FIG. 11a and extends toward the cover 310 or may be connected to a wiper arm (ca) including a cap which contacts with the top surface and both sides of the connector shown in FIG. 11b.

Also, as shown in FIG. 12c, the bottom surface of the body 320 includes a lower protrusion 351 which is inserted into the protrusion receiving recess 220 of the adaptor part 200, and a central portion receiving recess 355 in which the central portion 210 is received. Referring to FIGS. 10a and 12c, the central portion 210 of the adaptor part 200 is received in the central portion receiving recess 355, so that the central portion receiving recess 355 meets four sides of the central portion 210. Therefore, the central portion receiving recess 355 and the central portion 210 slide on the four sides. In the connector 300 according to the embodiment of the present invention, the sides of the lower protrusion 351 and the central portion receiving recess 355, on which the central portion 210 slides, may be formed to have an uneven shape. As a result of this, the sliding area is increased and the lower space of the connector 300 is reduced, so that a gap caused by the wiping is reduced and the wiping is stably performed.

FIGS. 13a to 13d are a perspective view and side views showing how the cover 310 and body 320 of the connector 300 are coupled to each other.

Referring to FIGS. 13a to 13d, the body 320 of the connector 300 according to the present invention further includes a coupling guide part 364 which guides the coupling of a coupling protrusion 311 of the cover 310. The coupling guide part 364 is formed adjacent to a coupling recess 363 of the body 320 and guides such that the coupling protrusion 311 of the cover 310 is coupled to the coupling recess 363.

As shown in FIGS. 13a to 13b, after the pair of the elastic moving pieces 362 is closer to each other in the direction of the arrow of FIG. 13a, the cover 310 is rotated such that the coupling protrusion 311 is inserted into the coupling guide part 364, and then the coupling protrusion 311 of the cover 310 is coupled downward in the direction of the arrow of FIG. 13b. As shown in FIG. 13c, after the coupling protrusion 311 is guided to the lowest end of the coupling guide part 364, the coupling protrusion 311 is coupled to the coupling recess 363 by rotating in the direction of the arrow of FIG. 13c, i.e., in a clockwise direction. Then, the cover moves toward the rear of the connector 300 in the direction of the arrow of FIG. 13d, so that the elastic restraint of the elastic moving piece 362 by the cover 310 is removed. As a result, the elastic moving piece 362 is widened outward. Accordingly, the forward and backward movement of the cover 310 is restricted by the elastic moving piece 362, and thus, the cover 310 is located at the fixing position.

Figure 14A:
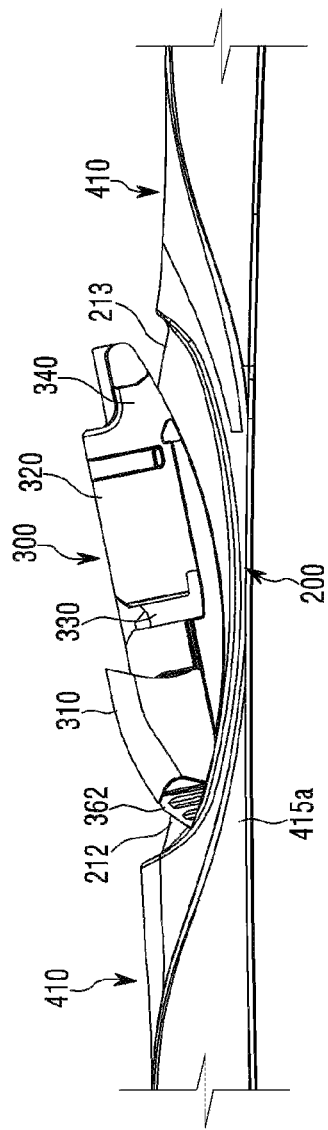
FIGS. 14a and 14b are a front view and a perspective view showing that a front portion of the connector coupled to the wiper blade according to the present invention has been pivoted downwardly during a wiping operation.
Figure 14B:
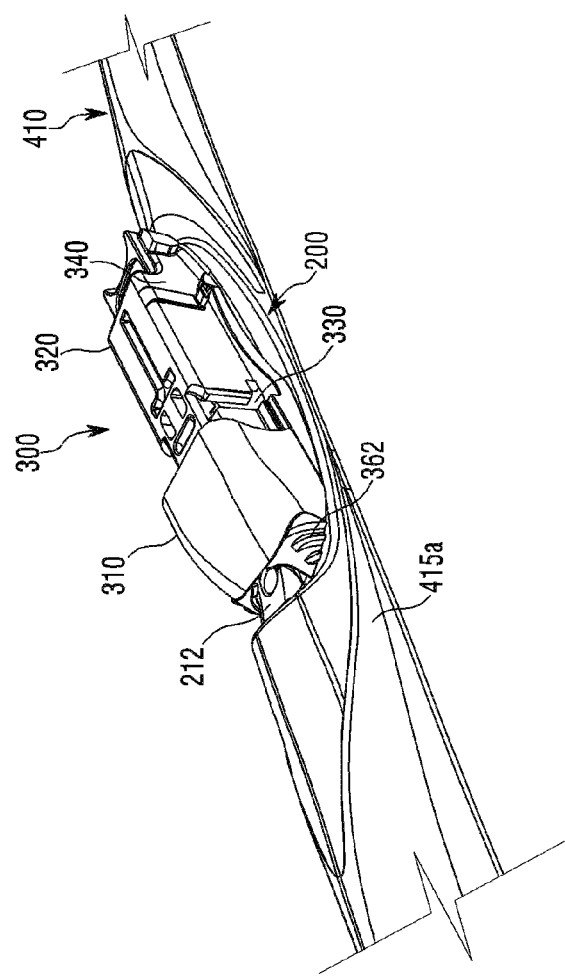

FIGS. 14a and 14b are a front view and a perspective view showing that a front portion of the connector coupled to the wiper blade according to the present invention has been pivoted downwardly during the wiping operation.

Referring to FIGS. 9a, 9b, 14a and 14b, the wiper blade according to the present invention is able to prevent the wiper arm from being separated from the wiper blade during the wiping operation.

Referring to FIGS. 9a and 9b, when the wiping is not performed, the wiper blade is parallel with the connector. Here, by inwardly pressing the side of the elastic moving piece 362, the cover 310 is able to move toward the front of the connector 300. However, during the wiping operation, as shown in FIGS. 14a and 14b, the connector 300 is pivoted in the counter-clockwise direction. Here, the elastic moving piece 362 is prevented from being inwardly pressed by the release point 212. Accordingly, it is possible to prevent the wiper arm from being separated from the wiper blade during the wiping operation.

Figure 15A:
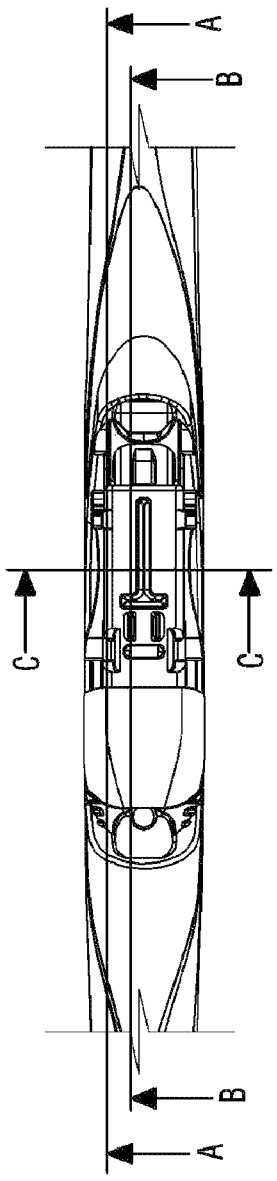
FIG. 15a is a plan view of the wiper blade to which the connector has been coupled.

FIG. 15a is a plan view of the wiper blade to which the connector has been coupled.

Figure 15B:
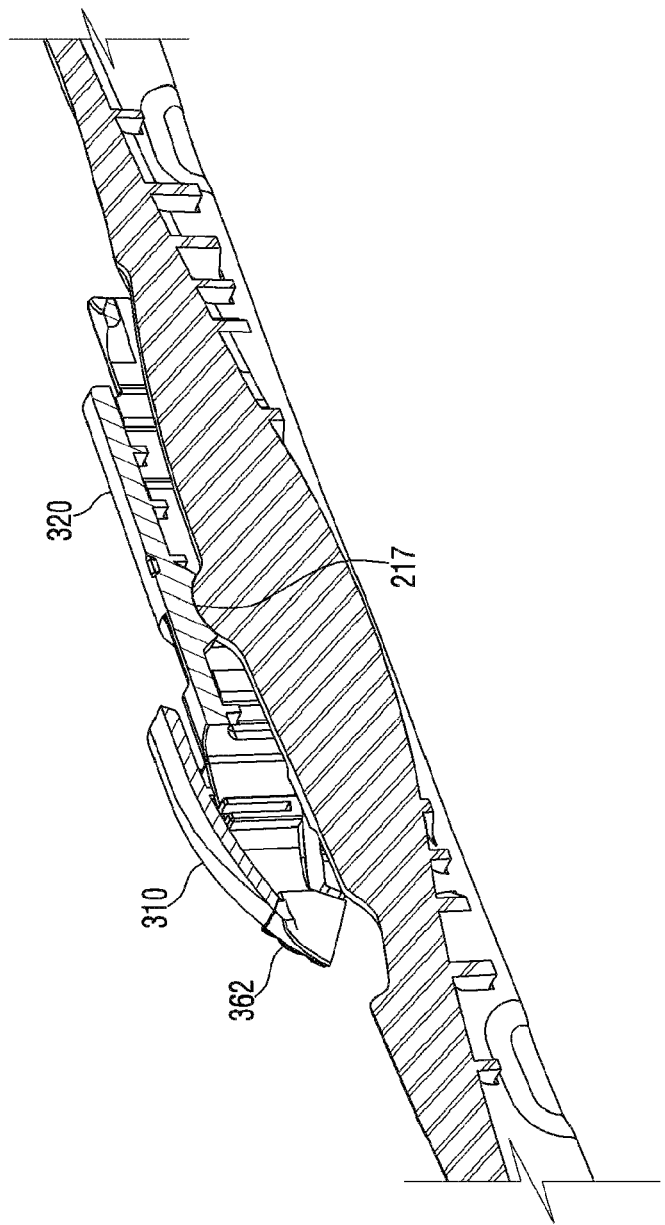
Figure 15C:
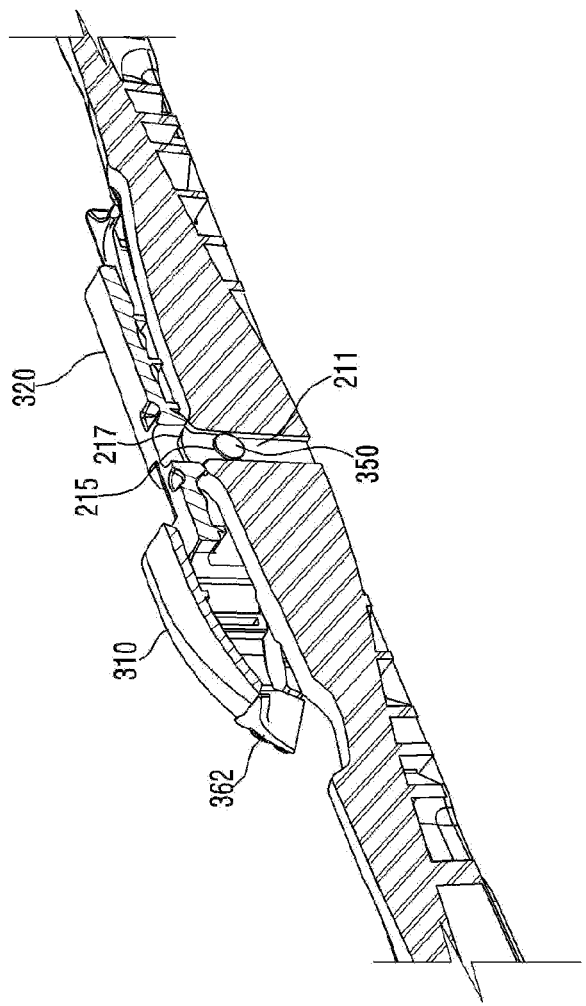

FIG. 15b is a cross sectional view taken along line A-A of FIG. 15a. FIG. 15c is a cross sectional view taken along line B-B of FIG. 15a.

Referring to FIG. 15a, the fitting part 350 is inserted into the fitting recess 211, and the fitting part 350 is caught by a catching protrusion 215, so that the connector 300 is coupled to the adaptor part 200.

Referring to FIGS. 10a to 10c, 12a to 12d, 15a, the fitting part 350 which causes the connector 300 to be mounted on the adaptor part 200 by being received in the fitting recess 211 of the adaptor part 200 is included within the lower portion of the connector 300. The connector 300 may be coupled downward to the adaptor part 200 in a sliding manner. Here, the fitting part 350 of the connector 300 is coupled to the fitting recess 211 of the resin-made adaptor part 200, and the upward movement of the fitting part 350 is restricted by the catching protrusion 215. As such, because the fitting part 350 is elastically coupled to the fitting recess 211 and is restricted by the catching protrusion 215, the connector 300 is prevented from being separated from the adaptor part 200. Meanwhile, in the embodiment of the present invention, although the fitting part 350 formed on the outer surface of the lower protrusion 351 of the connector 300 is coupled to the fitting recess 211 formed in the inner surface of the central portion 210 of the adaptor part 200, there is no limit to this. That is, the fitting part 350 may be formed on the outer surface of the central portion receiving recess 355 of the connector 300, and the fitting recess 211 may be formed on the outer surface of the central portion 210 in such a manner as to receive the fitting part 350.

The fitting recess 211 of the adaptor part 200 receives elastically the fitting part 350 of the connector 300, thereby preventing the connector 300 from being separated from the adaptor part 200.

Referring to FIG. 15b, a pivot guide 217 is formed in the center of the adaptor 200. The inner lower portion of the connector 300 is formed to be engaged in correspondence with the pivot guide 217. Therefore, the connector 300 is allowed to pivot within a range of the pivot guide by the pivot guide 217.

Referring to FIG. 15c, it can be seen that the fitting part 350 is located at the fitting recess 211 and is fixed by the catching protrusion 215.

Figure 16A:
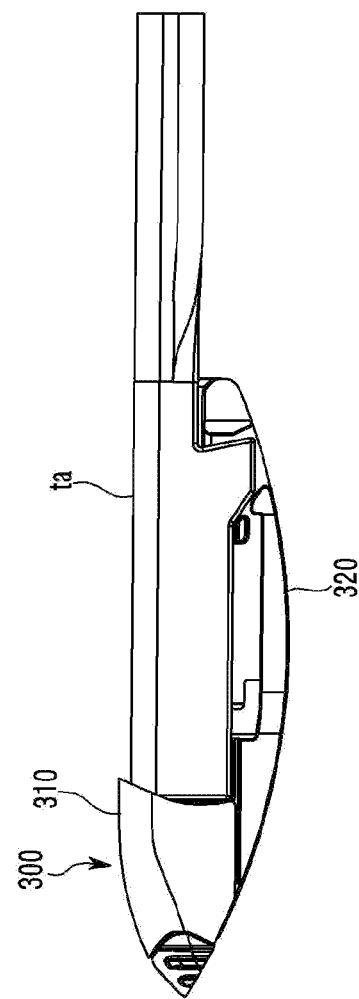
Figure 17A:
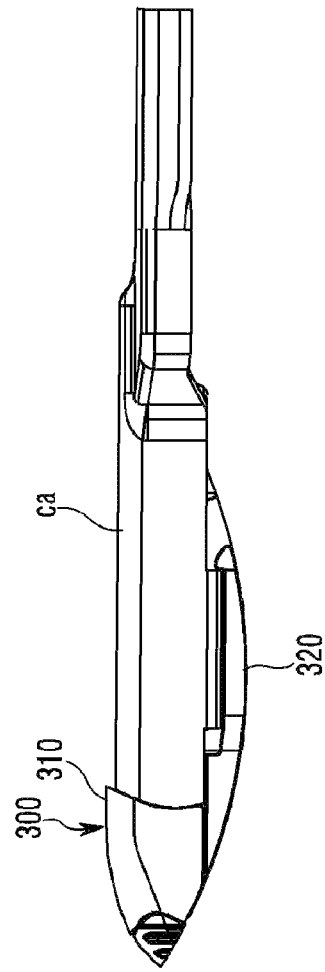
FIGS. 17a and 17b are views showing how a wiper arm and the connector are coupled to each other.
Figure 17B:
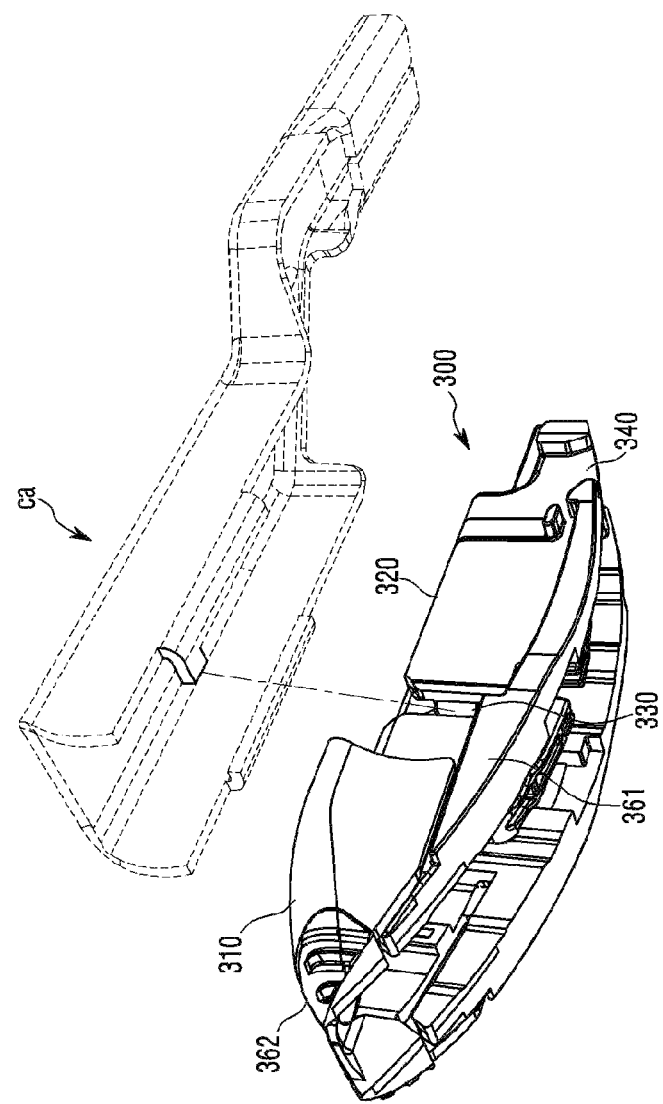

FIGS. 16a and 17b show assembly type of the wiper blade coupled to various types of wiper arms.

As shown in FIG. 12d, a pair of the coupling protrusions 311 and a support 312 are formed within the cover 310. The pair of the coupling protrusions 311 are inserted into the coupling recess 363 formed on the side of the body 320 and guide the forward and backward movements of the cover 310. In order to attach or remove the wiper arm to or from the connector 300, the cover 310 performs a linear forward and backward movement guided by the coupling recess 363. As a result, even though a rotation moment is generated in a direction in which the wiper arm is separated from the wiper blade during the wiping operation, for example, upwardly, the cover of the connector only moves forward and backward and is slightly inclined upward and downward without moving upward and downward, so that it is possible to prevent that the wiper arm is separated from the wiper blade by the rotation moment generated in the wiper arm. Consequently, the cover 310 is not opened by the rotation moment of the wiper arm when the wiping is performed, so that the wiper arm can be prevented from being separated from the wiper blade 10.

Also, because the coupling protrusion 311 of the cover 310 is coupled to the coupling recess 363 of the body 320, the cover 310 is connected to the body 320. Accordingly, a possibility that the cover 310 is lost is reduced.

Meanwhile, the support 312 is able to prevent that right and left gaps are created at the fixing position between the cover 310 and the body 320. Accordingly, the connector 300 is able to stably restrict the wiper arm, thereby causing the wiper blade to stably wipe.

The body 320 may include a lower support 361 which partially supports the lower portions of the cover 310 and the wiper arm, the coupling recess 363 to which the coupling protrusion 311 of the cover 310 is coupled, and the elastic moving piece 362 which catches at least a portion of the end of the cover 310, and thus, restricts, at the fixing position, the movement of the cover 310.

Referring to FIGS. 12a to 12d, the first coupling part 330 includes a slot recess and a sliding part in order to be coupled to the wiper arm (ca) including the cap which contacts with the top surface and both sides of the connector 300. The slot recess is formed in the first coupling part 330 guiding from the upper portion to the lower portion of the connector 300. The sliding part is formed in the lower portion of the connector 300 such that the catching protrusion of the wiper arm guided along the slot recess slides backward and is supported in the sliding part.

The second coupling part 340 is formed to support the catching protrusion of the wiper arm (ta) including the tap which contacts with the top surface and both sides of the connector 300 and extends toward the cover 310. The cover 310 is formed to surround the upper portion of the body 320. The cover 310 is able to prevent forward, backward, and upward movement of the wiper arm by covering on a portion of the front end or top surface of the wiper arm. A lower portion 353 formed in the lower rear portion of the body 320 contacts with the support 213 of the adaptor part 200. The cover 310 may be formed to surround both sides of a portion of the body 320 and to have an open front side thereof. Therefore, one end of the cover 310 may be caught at the fixing position by the elastic moving piece 362, and the elastic moving piece 362 may be located within the lower portion of the cover 310 at the release position.

The following description will focus on how the connector 300 is coupled to the adaptor part 200 with reference to FIGS. 10a to 10c and 12a to 12d.

The connector 300 is coupled downward from the top of the adaptor part 200. The lower portion of the body 320 includes the fitting part 350 which is received in the fitting recess 211 of the central portion 210 of the adaptor part. Also, a central connection recess 354 is formed in the lower portion of the body 320 and may receive the central connection portion 214 of the adaptor part 200. Therefore, the central connection recess 354 bears some of the moment applied to the fitting recess 211 and the fitting part 350, thereby increasing the stiffness and moment resistance during the wiping operation.

As shown in FIGS. 12a to 12d, the coupling recess 363 which guides the movement of the cover 310 may be formed to be inclined upwardly toward the front end of the connector 300.

For the purpose of coupling the wiper arm to connector 300, when the wiper arm is coupled to and supported by the first coupling part 330 or the second coupling part 340 formed in the side of the connector 300, the cover 310 at the release position slides toward the rear of the connector 300 along the coupling recess 363. When the cover 310 moves to the fixing position along the coupling recess 363, the elastic moving piece 362 formed in one end of the body 320 of the connector 300 is coupled to elastically restrain the movement of the cover 310. The elastic moving piece 362 may be formed at the fixing position to contact with at least a portion of the end of the cover 310. As a result, the forward, backward and upward movement of the wiper arm is limited. Accordingly, the cover 310 may be formed to surround both sides of a portion of the body 320 and to have an open front side thereof such that the elastic moving piece 362 protrudes.

Next, a process of separating the wiper arm from the wiper blade assembly will be described.

Figure 18B:
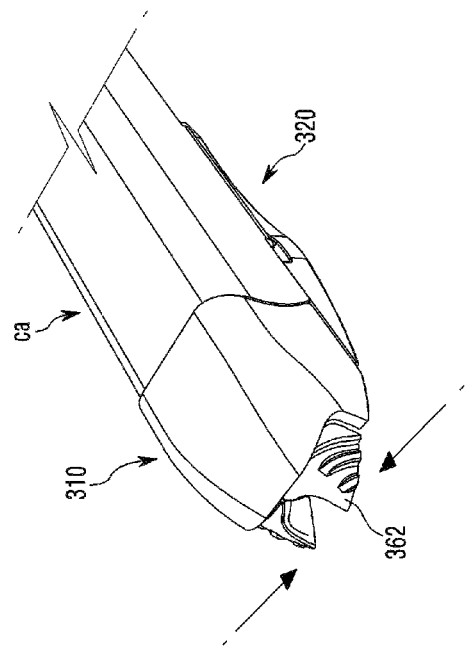
FIGS. 18a to 18c are views showing that the cover of the connector moves from the fixing position to a release position.
Figure 18A:
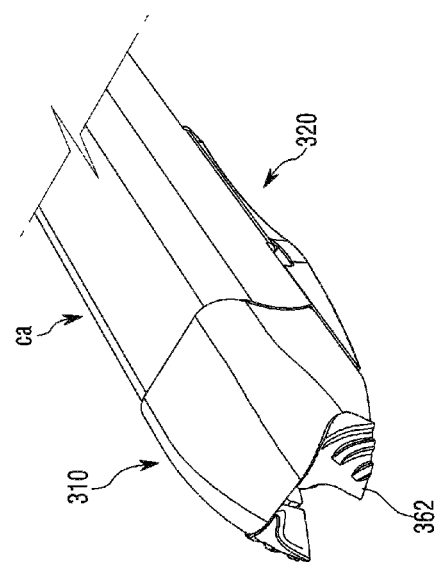
Figure 18C:
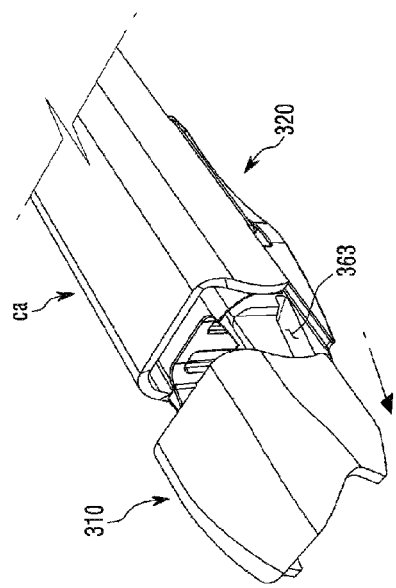

FIGS. 18a to 18c are views showing that the cover of the connector moves from the fixing position to the release position.

Figure 19:
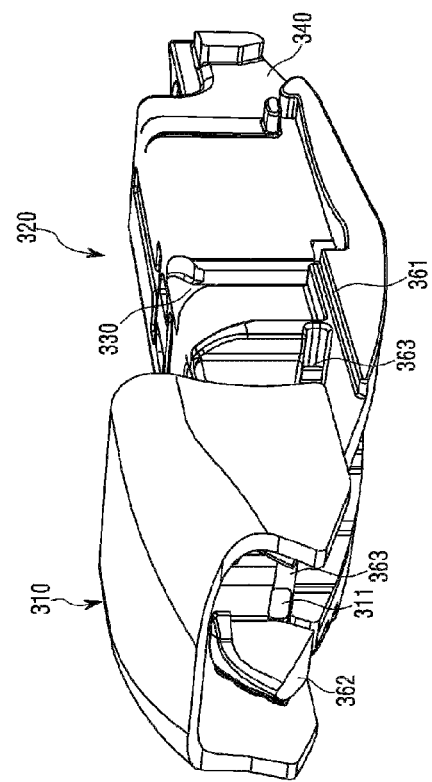
FIG. 19 is a perspective view of the connector of which the cover of the present invention is placed on the release position.

FIG. 19 shows that the cover of the connector has moved to the release position.

As shown in FIGS. 12a to 12d and 18a, the cover 310 fixes the wiper arm which is caught at the fixing position by the body 320. The wiper arm is caught by one or more coupling parts 330 and 340 formed on both sides of the body 320, and a portion of the upper front of the wiper arm is covered by the cover 310, so that the upward, downward, forward and backward movement of the wiper arm is restricted. Meanwhile, as shown in FIG. 18b, when a releasing force is applied to the elastic moving piece 362 protruding toward the front of the cover 310 in order to remove the elastic restraint, the cover 310 is able to move to the release position because the cover 310 is not restricted by the elastic moving piece 362. Specifically, when an external force is applied to cause the pair of the elastic moving pieces 362 to be closer to each other, the movement restriction of the cover 310 is released because the elastic moving piece 362 is not caught by the end of the cover 310. Thus, the cover 310 becomes able to move forward. As shown in FIG. 18c, the cover 310 slides toward the front of the connector 300 along the coupling recess 363, and then is placed at the release position. Accordingly, the wiper arm can be separated from the first coupling part 330 or the second coupling part 340.

As shown in FIGS. 18a and 19, the coupling recess 363 of the body 320 may be formed to be inclined upwardly toward the front of the connector 300. The coupling recess 363 may be inclined in such a manner as to correspond to the shape of the adaptor part 200. Due to the inclination of the coupling recess 363, the cover 310 is able to move forward and backward. Since the cover 310 moves inclinedly, the length of the adaptor part can be less than that of a case where the cover 310 only moves forward and backward. Therefore, it is possible to obtain more excellent space utilization.

Accordingly, the connector 300 according to the embodiment of the present invention requires less space than that required by the connector in a case where the cover 310 moves along the straight line, so that the length of the adaptor part 200 to which the connector 300 is coupled may be shortened. Also, the length of the concave part 240 in which the adaptor part 200 is formed may be shortened. As a result, the concave part 240 occupies a smaller space of the wiper blade 10, so that it is easy to obtain the rigidity of the wiper blade 10.

Therefore, the connector 300 according to the embodiment of the present invention requires less space than a space required by the connector in a case where the cover part 310 moves along the straight line, so that the length of the adaptor part 200 to which the connector is coupled may be shortened. Also, the length of the concave part 240 in which the adaptor part 200 is formed may be shortened. Accordingly, the concave part 240 occupies a smaller space of the wiper blade 10, so that it is easy to obtain the rigidity of the wiper blade 10.

Meanwhile, while the embodiment of the present invention describes that the fitting part 350 of the connector 300 is received in and coupled to the fitting recess 211 of the adaptor part 200, there is no limit to this. It is obvious that the fitting recess formed in the connector 300 may be coupled to the fitting part formed in the adaptor part 200.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the present invention has been described based on the preferred embodiment thereof, the embodiment is only illustrative and does not limit the present invention. It can be understood that those skilled in the art can achieve various modifications and applications that are not shown herein, without departing from the essential characteristics of the present invention. That is, each component described in the embodiments in detail may be modified and then implemented in various ways. Furthermore, it should be understood that the differences associated with the modifications and applications are included in the scope of the present invention, which is defined in the accompanying claims.

What is claimed is:

1. A wiper connector for a vehicle, which connects a wiper arm to a wiper blade, the wiper connector comprising:
   a body comprising a pair of elastic moving pieces which is formed on one end thereof and faces each other, and one or more coupling parts which are formed on both sides thereof and by which the wiper arm is caught; and
   a cover movable to a fixing position for fixing the wiper arm which is caught by the body and to a release position for releasing the fixed wiper arm,
   wherein the pair of the elastic moving pieces elastically restrains the movement of the cover at the fixing position and allows the cover to move to the release position when a releasing force for removing the elastic restraint is applied inwardly to the elastic moving piece exposed outward at the fixing position, and wherein the elastic moving piece is prevented from being pressed inwardly by a release point of the wiper blade during a wiping operation of the wiper blade.

2. The wiper connector for a vehicle of claim 1, wherein the cover surrounds both sides of a portion of the body and has an open front side thereof such that one end of the cover is caught at the fixing position by the elastic moving piece and the elastic moving piece is located within the lower portion of the cover at the release position.

3. The wiper connector for a vehicle of claim 1, wherein the elastic moving piece is formed at the fixing position to contact with at least a portion of an end of the cover.

4. The wiper connector for a vehicle of claim 1, wherein the body further comprises coupling recesses formed in both sides thereof, and wherein a pair of coupling protrusions formed within the cover are coupled to the coupling recesses and guide a forward and backward movement of the cover.

5. The wiper connector for a vehicle of claim 4, wherein the coupling recesses are formed to be inclined upwardly toward a front of the connector.

6. The wiper connector for a vehicle of claim 4, wherein the body further comprises coupling guide parts formed on both sides of the body and guide the coupling of the pair of the coupling protrusions of the cover and the coupling recesses, and wherein the pair of coupling protrusions and the coupling recesses are coupled by (i) moving one of the pair of the elastic moving pieces towards another of the pair of the elastic moving pieces, (ii) rotating the cover at a predetermined angle such that the pair of coupling protrusions is inserted into the coupling guide parts in accordance with the shapes of the coupling protrusions and the coupling guide parts, (iii) guiding the pair of coupling protrusions from the top to the bottom of the body along the coupling guide parts, and (iv) rotating the cover in a direction opposite to the rotation direction of the predetermined angle.

7. The wiper connector for a vehicle of claim 1, wherein the body further comprises a fitting part which is formed to protrude within the body and is fitted and coupled to a fitting recess formed in the center of the wiper blade.

8. The wiper connector for a vehicle of claim 7, wherein the fitting part slides on the fitting recess from the top to the bottom of the fitting recess and an upward movement of the fitting part is restricted by a catching protrusion formed on the fitting recess, so that the fitting part is coupled to the fitting recess.

9. The wiper connector for a vehicle of claim 1, wherein a protrusion receiving recess into which a lower protrusion formed in a lower portion of the body is inserted is formed in a central portion of the wiper blade, wherein the central portion is comprised of a pair of plate-shaped members which faces each other and protrudes parallel to each other, wherein a bottom surface of the body comprises a central portion receiving recess receiving the pair of the plate-shaped members, and wherein an uneven structure is formed on at least a portion of a side of the lower protrusion and a side of the central portion receiving recess.

10. The wiper connector for a vehicle of claim 9, wherein a central connection portion connecting the plate-shaped members is formed between the pair of the plate-shaped members, and wherein the lower portion of the body comprises a central connection recess receiving the central connection portion.

11. The wiper connector for a vehicle of claim 9, wherein the central portion comprises an opening extending through the central portion.

12. The wiper connector for a vehicle of claim 1, wherein the wiper connector is selectively connected either to a first wiper arm comprising a tap which contacts with the top surface and both sides of the wiper connector and extends toward the cover, or to a second wiper arm comprising a cap which contacts with the top surface or side of the wiper connector.

13. The wiper connector for a vehicle of claim 1, wherein the elastic moving pieces is pivoted downward during a wiping operation.

* * * * *